July 15, 1958   L. E. SEVISON   2,843,027
MACHINE FOR MAKING PLASTIC BOXES
Filed Jan. 10, 1952   22 Sheets-Sheet 1

INVENTOR.
Luther E. Sevison
BY
Malcolm W. Preece
ATTORNEY

July 15, 1958 L. E. SEVISON 2,843,027
MACHINE FOR MAKING PLASTIC BOXES
Filed Jan. 10, 1952 22 Sheets-Sheet 2
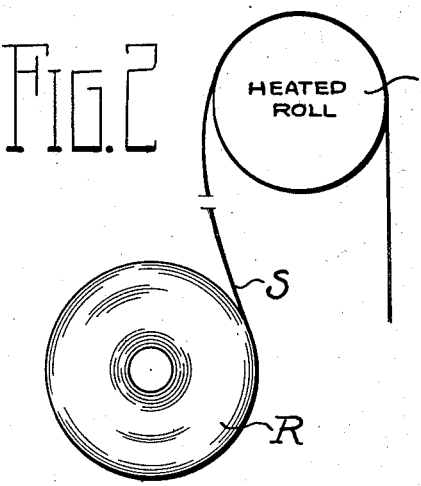
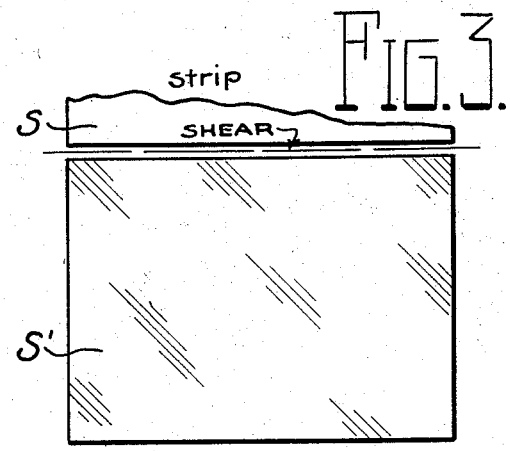
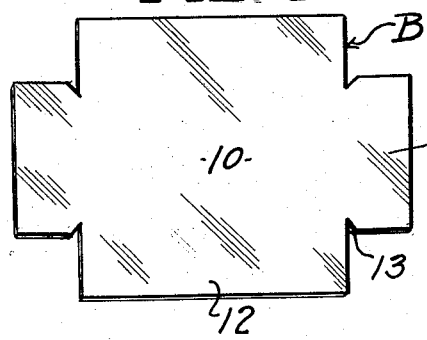
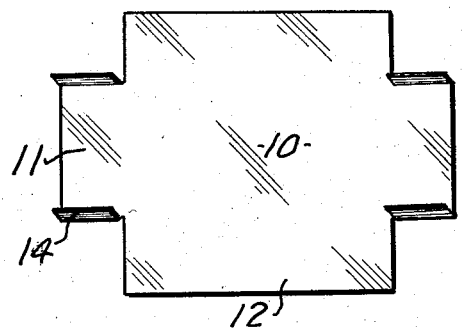
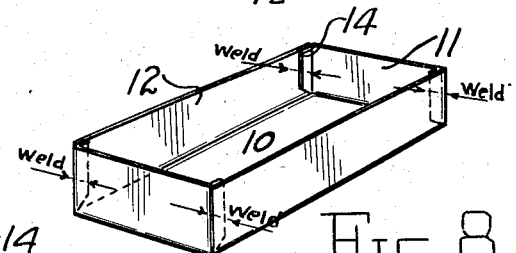
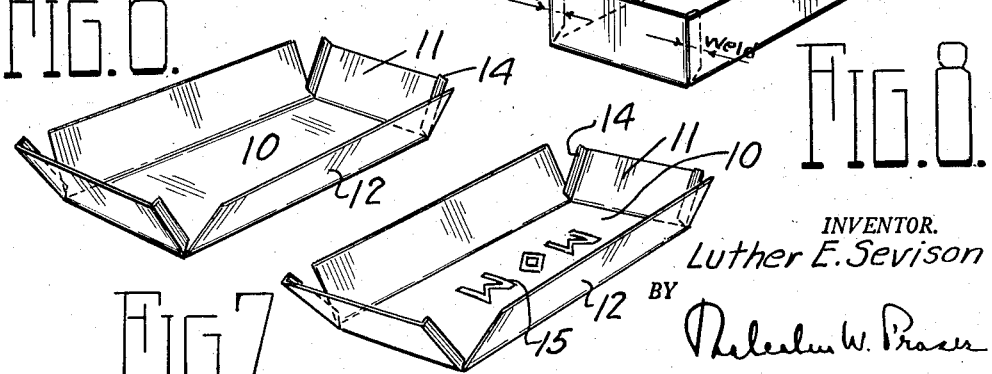
INVENTOR.
Luther E. Sevison
BY
ATTORNEY July 15, 1958 L. E. SEVISON 2,843,027
MACHINE FOR MAKING PLASTIC BOXES
Filed Jan. 10, 1952 22 Sheets-Sheet 3
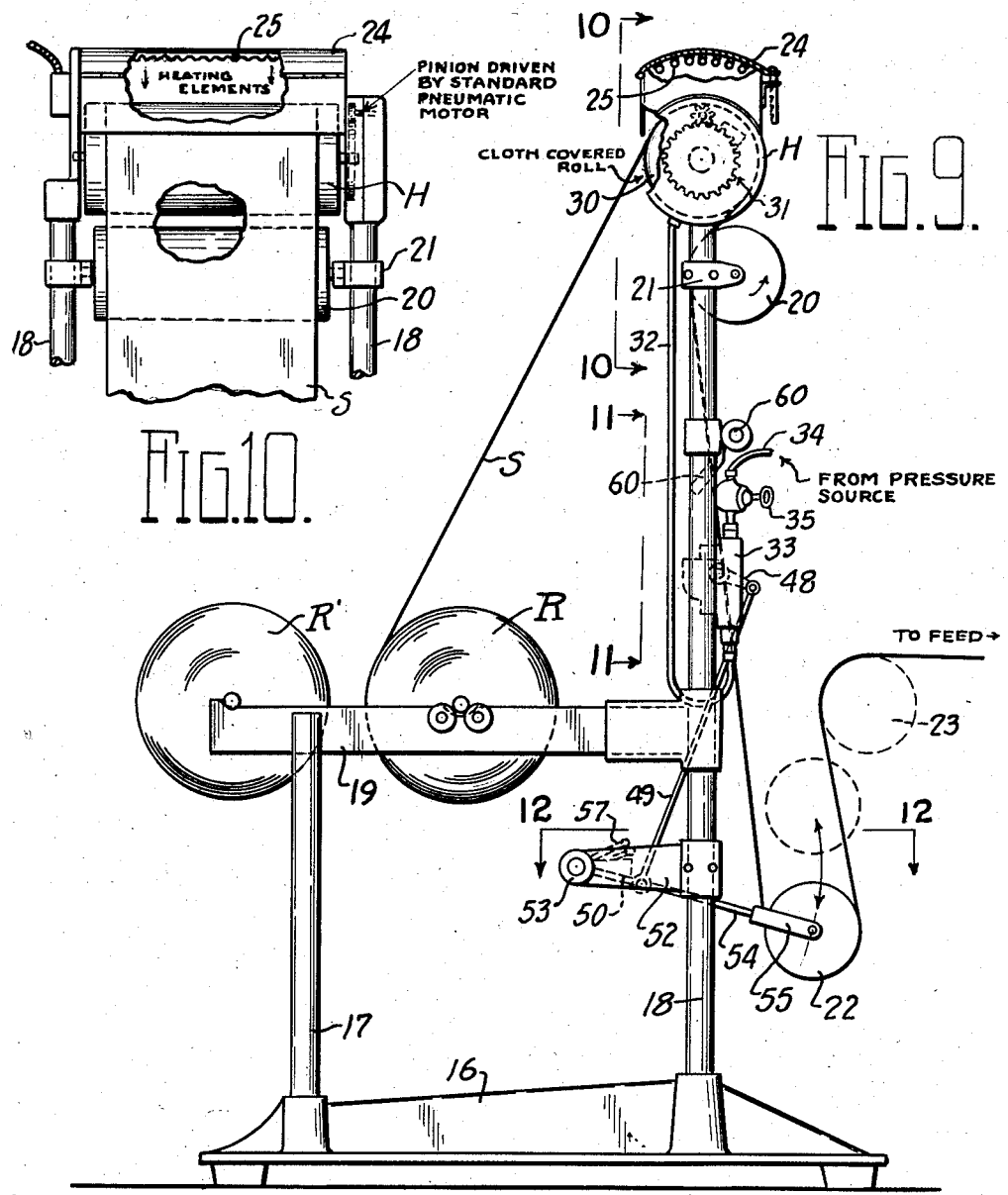
INVENTOR.
Luther E. Sevison
BY
ATTORNEY July 15, 1958  L. E. SEVISON  2,843,027
MACHINE FOR MAKING PLASTIC BOXES
Filed Jan. 10, 1952  22 Sheets-Sheet 4
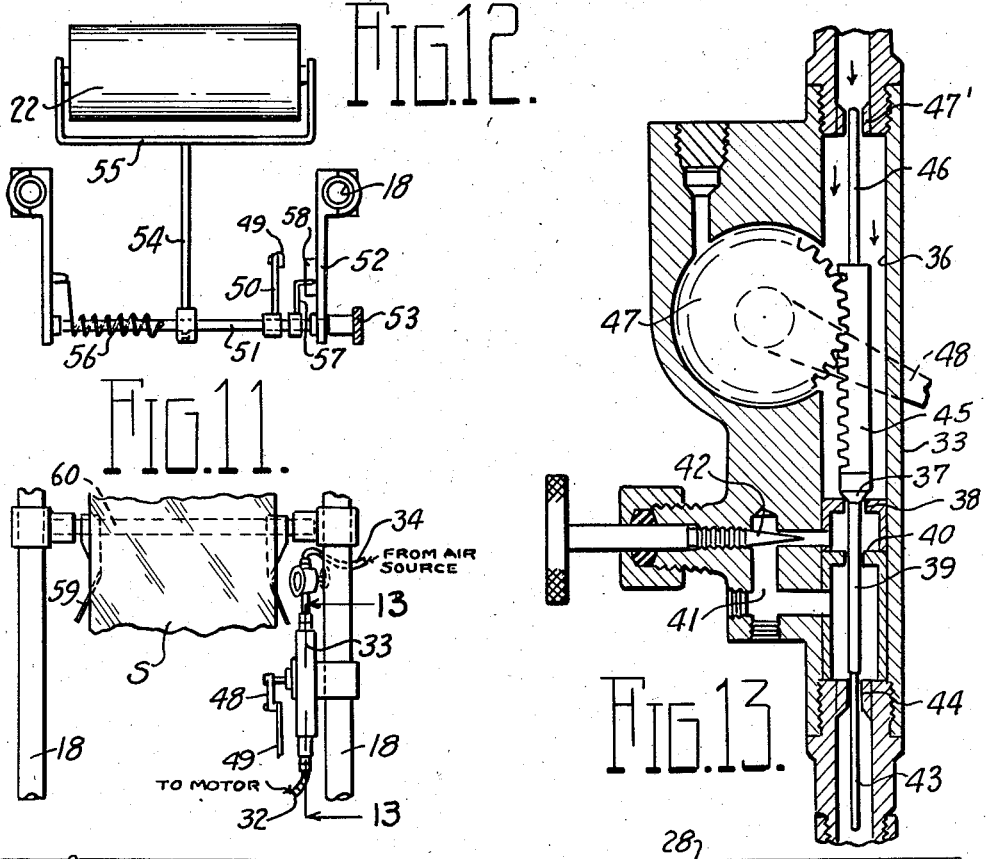
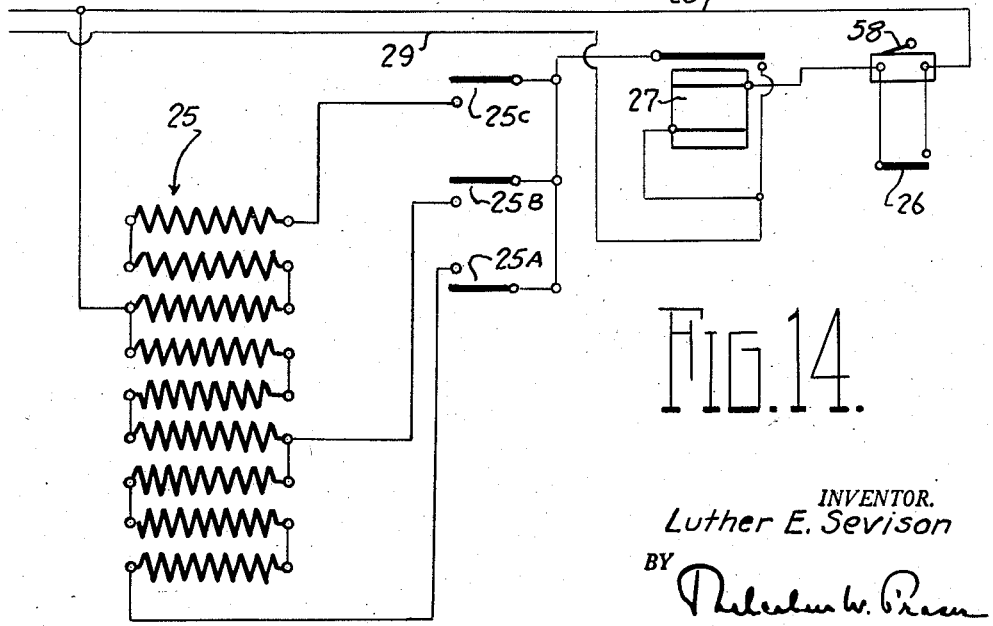
INVENTOR.
Luther E. Sevison
BY
ATTORNEY

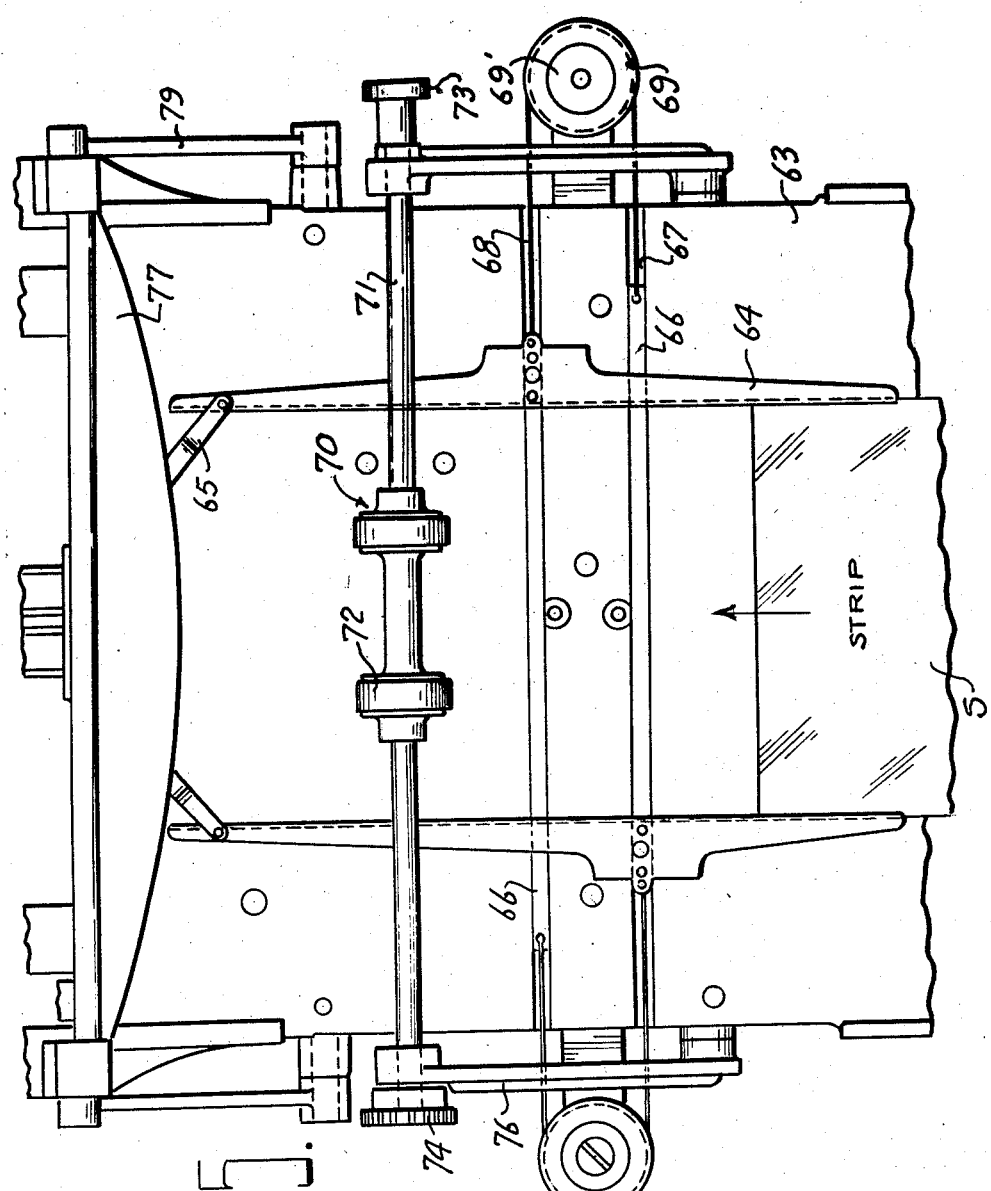

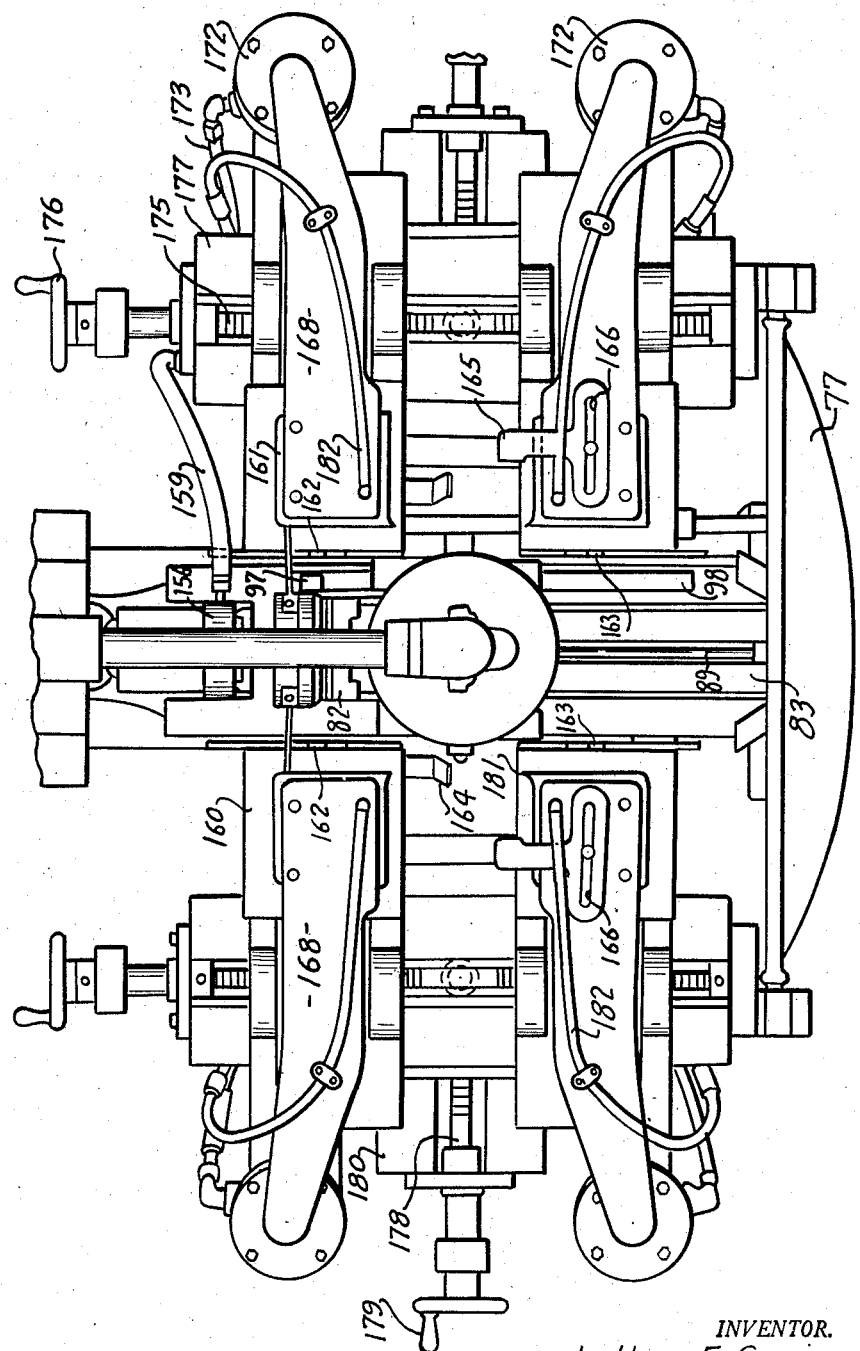

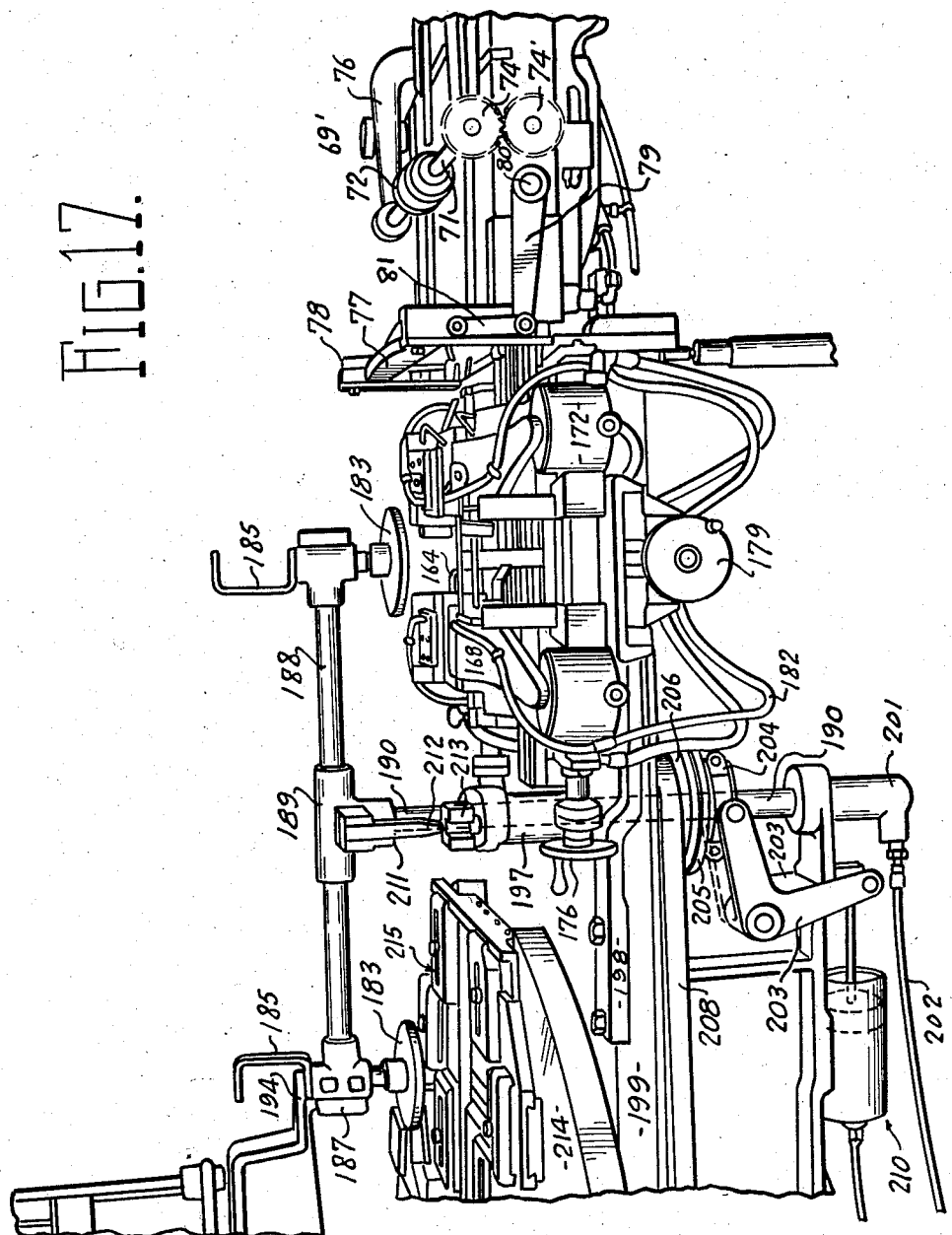

July 15, 1958 L. E. SEVISON 2,843,027
MACHINE FOR MAKING PLASTIC BOXES
Filed Jan. 10, 1952 22 Sheets-Sheet 8
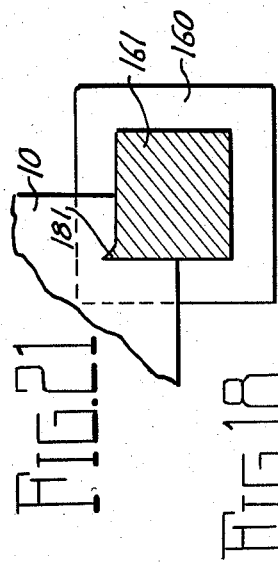
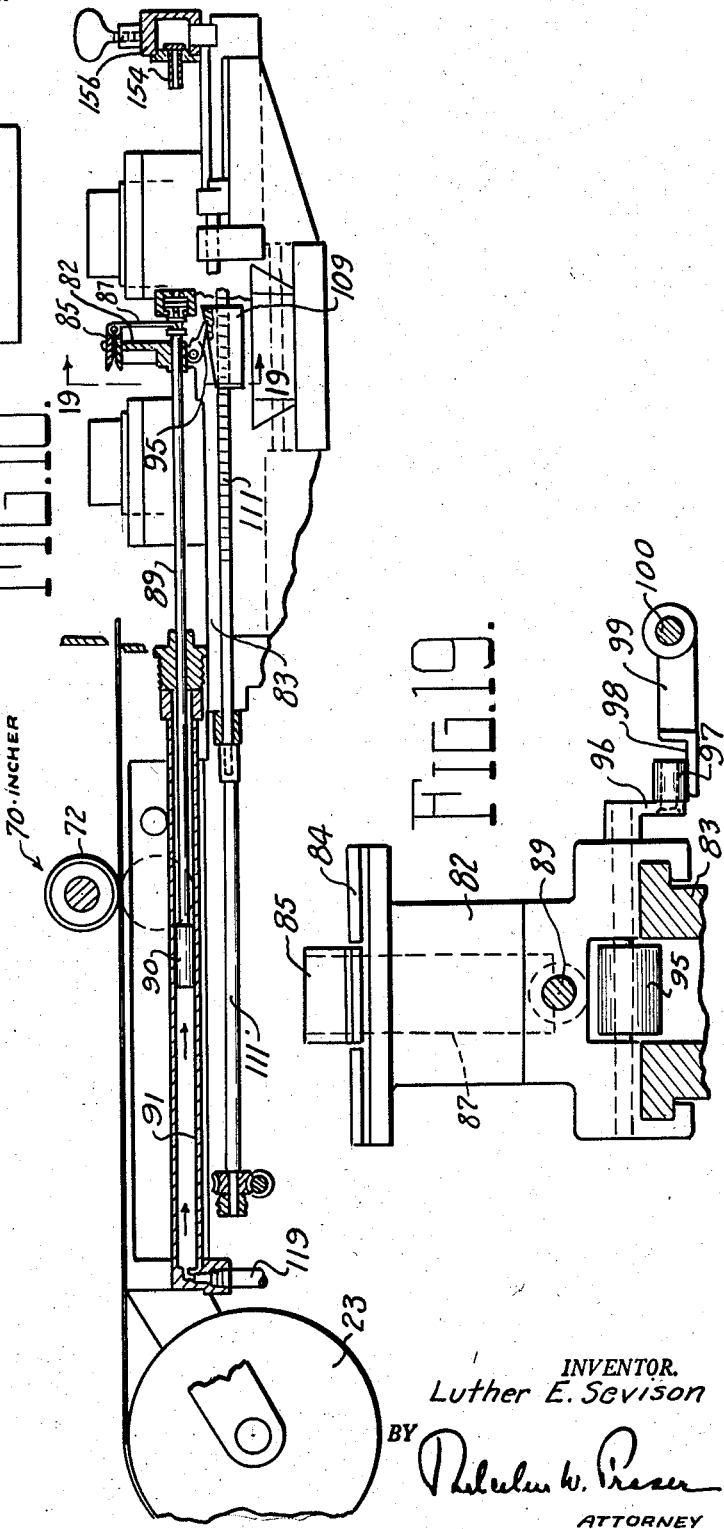
INVENTOR.
Luther E. Sevison
BY
ATTORNEY July 15, 1958

L. E. SEVISON 2,843,027

MACHINE FOR MAKING PLASTIC BOXES

Filed Jan. 10, 1952

INVENTOR.
Luther E. Sevison

BY

ATTORNEY

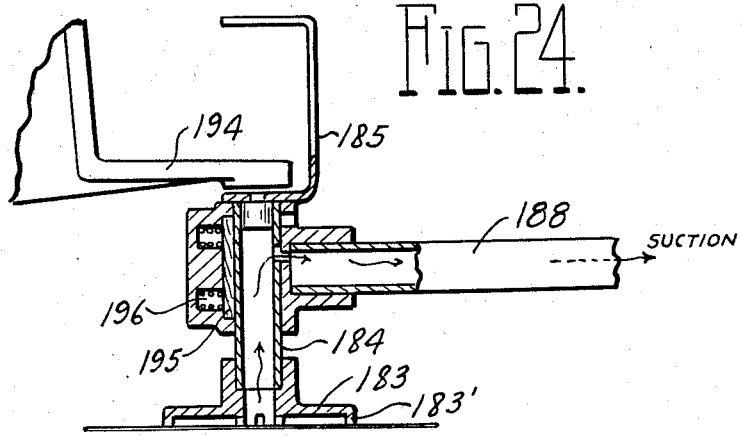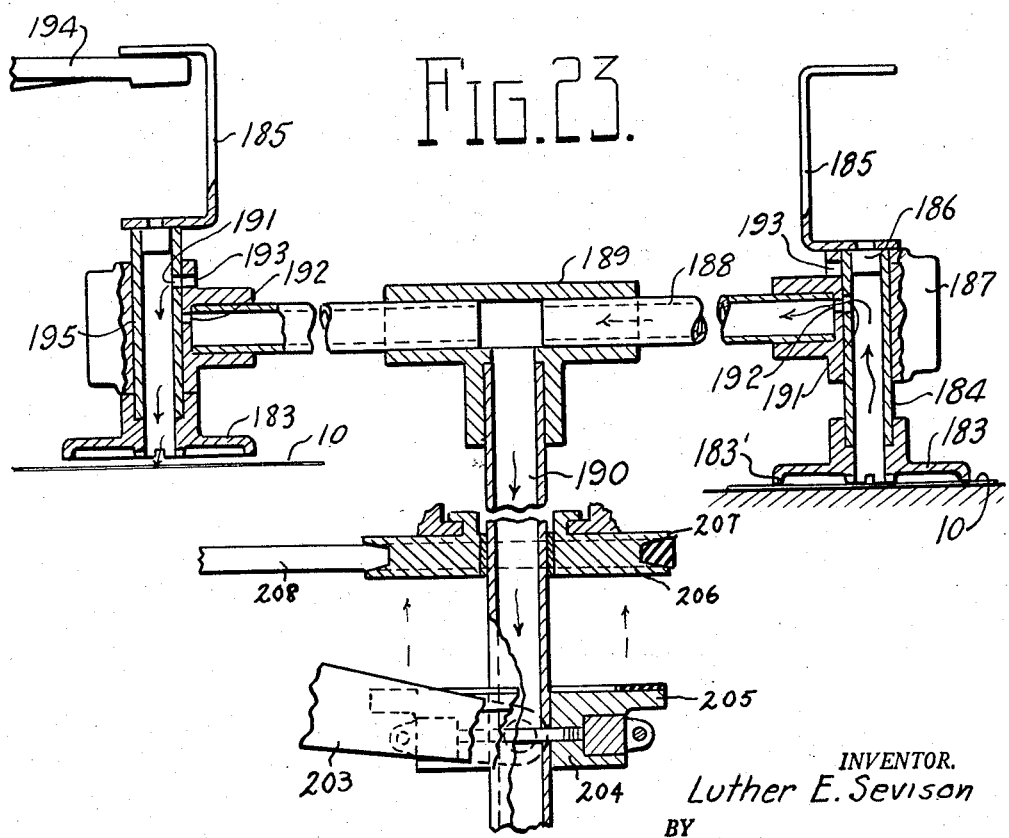

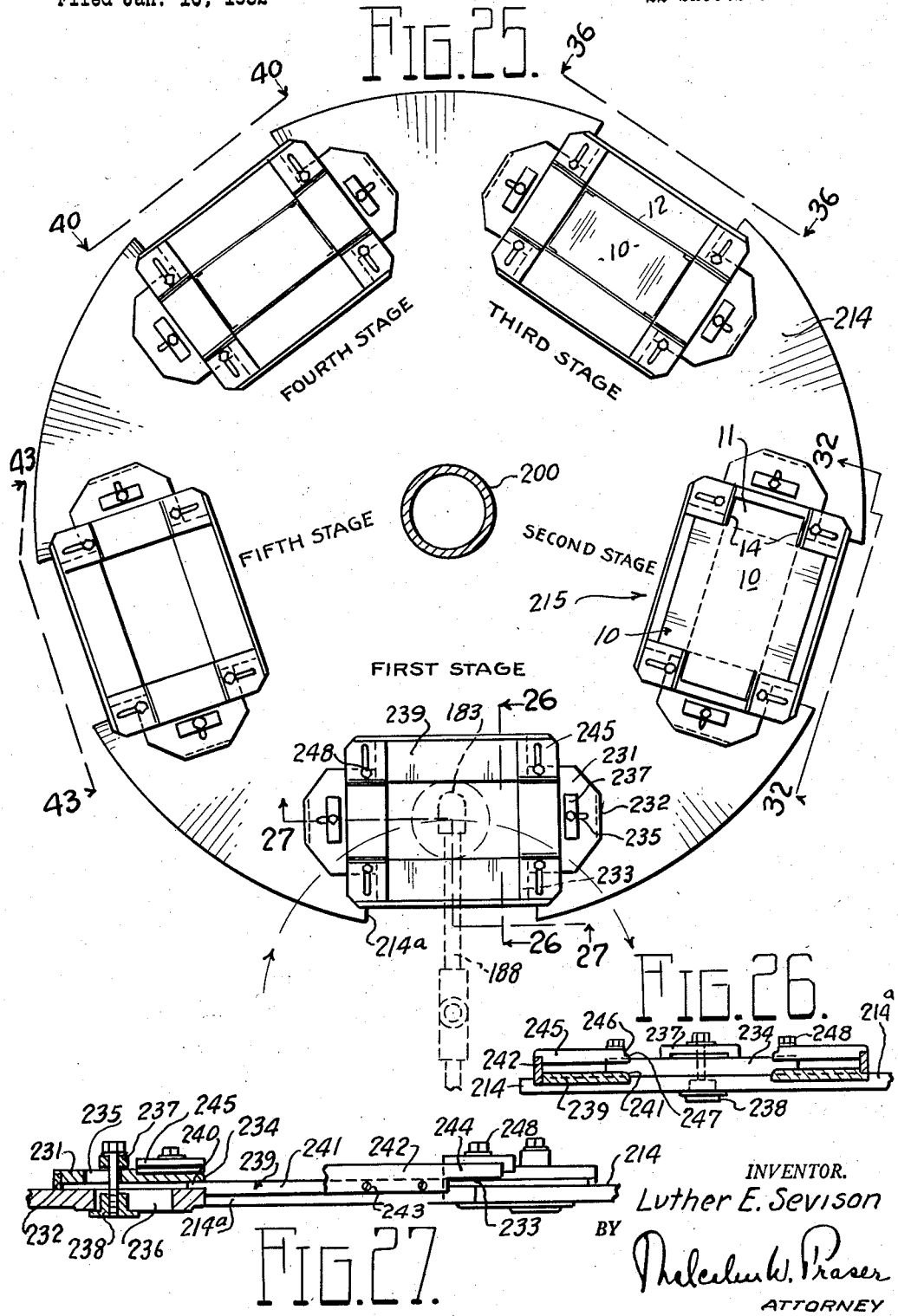

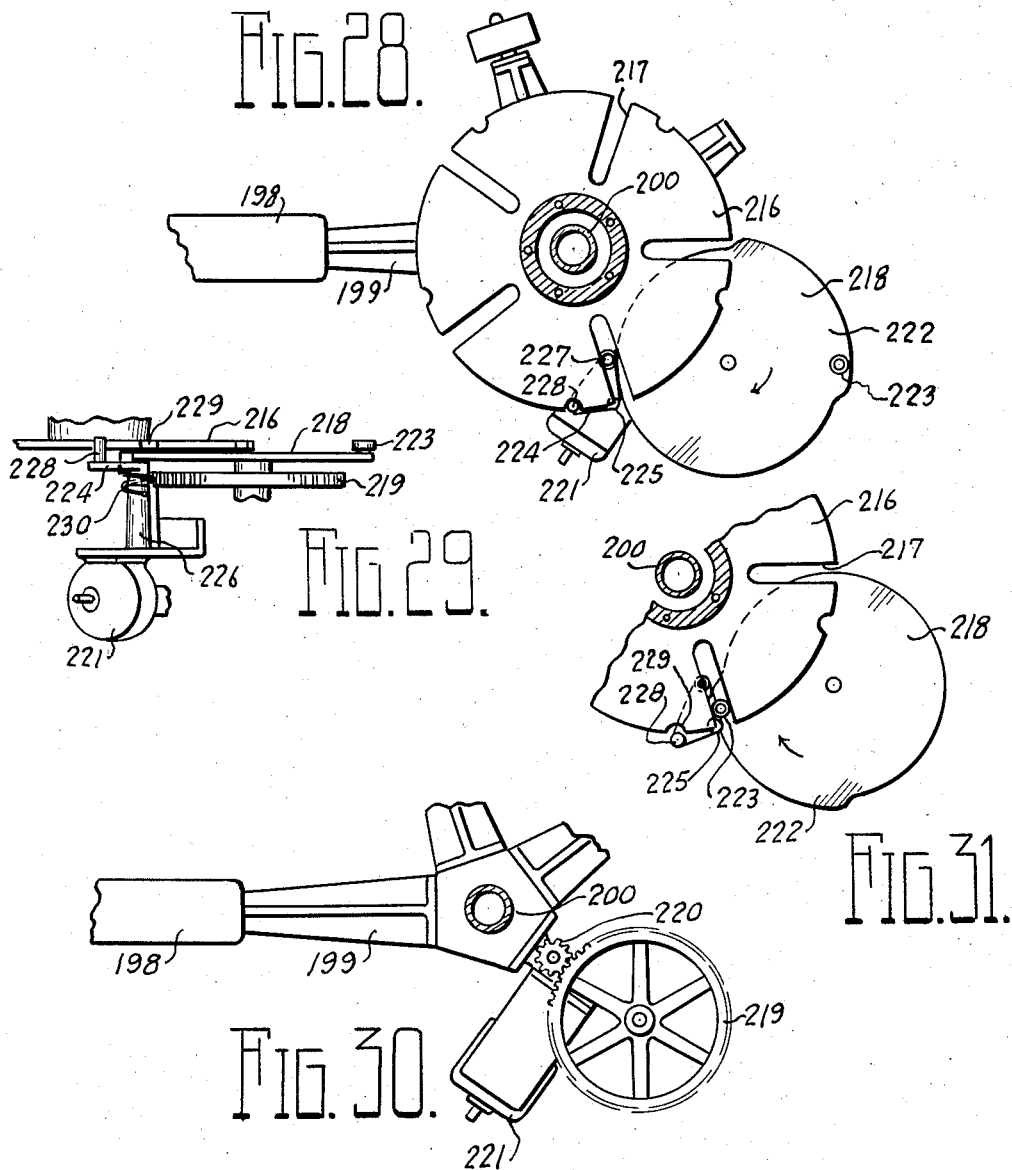

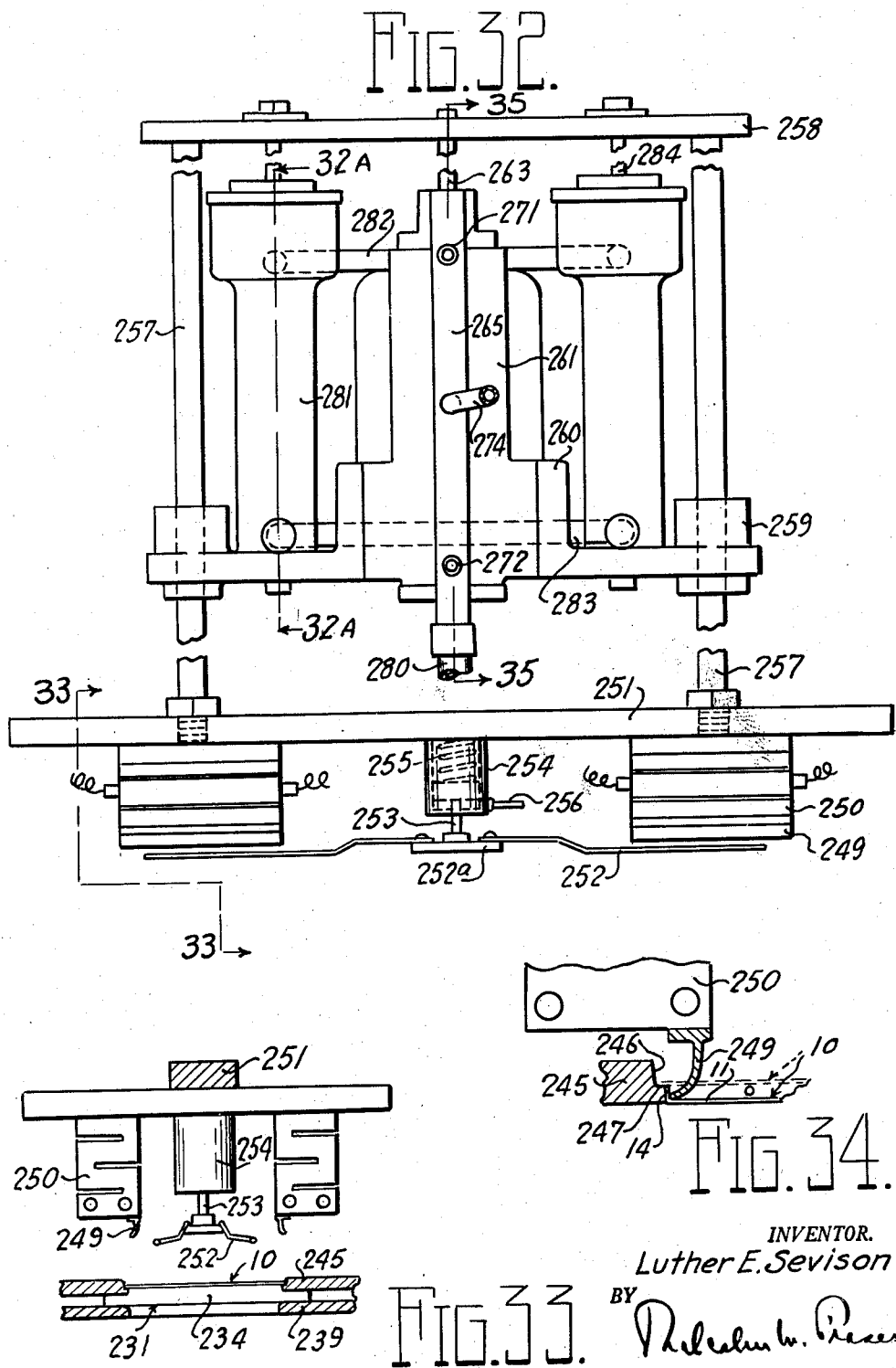

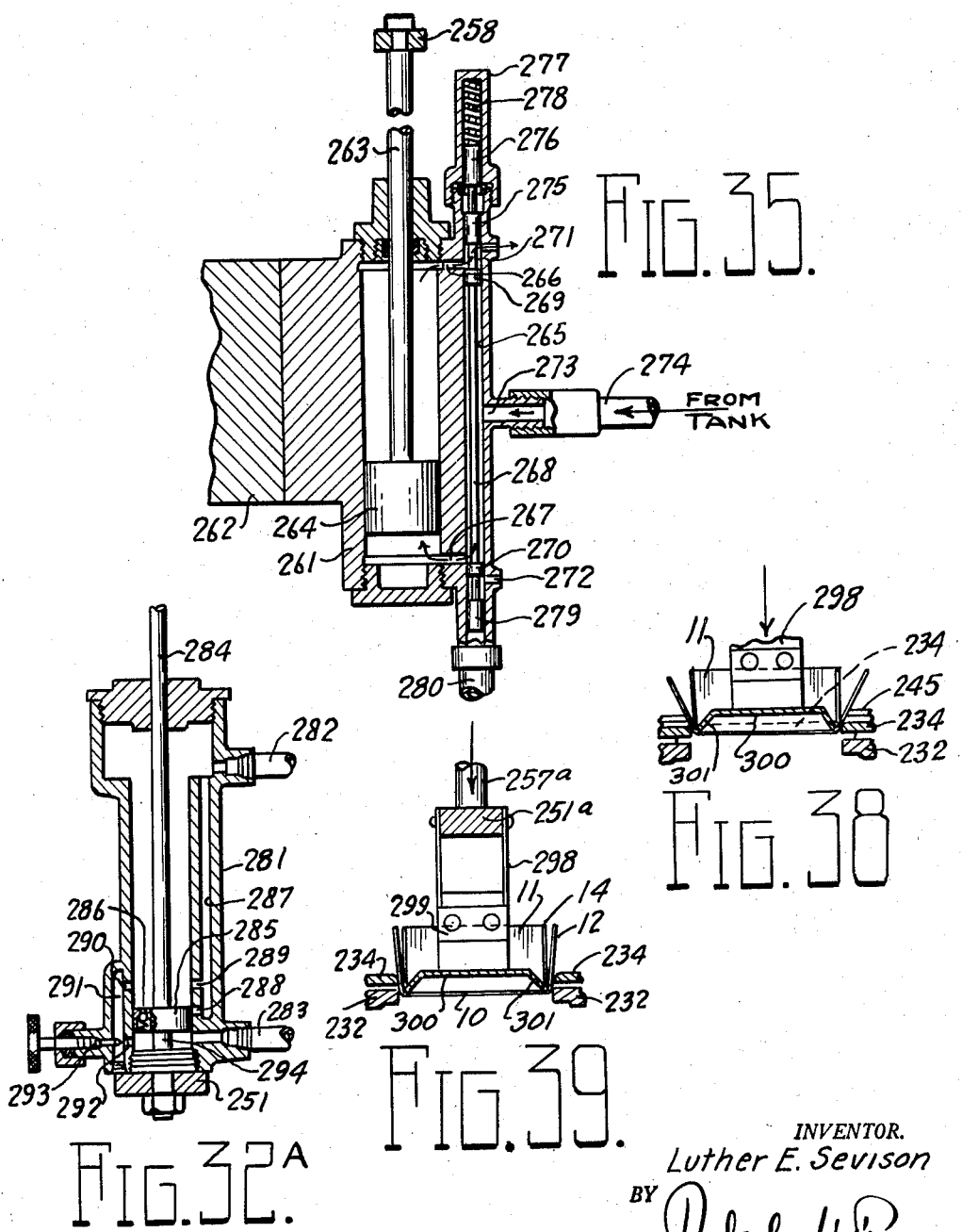

July 15, 1958 L. E. SEVISON 2,843,027
MACHINE FOR MAKING PLASTIC BOXES
Filed Jan. 10, 1952 22 Sheets-Sheet 15

INVENTOR.
Luther E. Sevison
BY
ATTORNEY

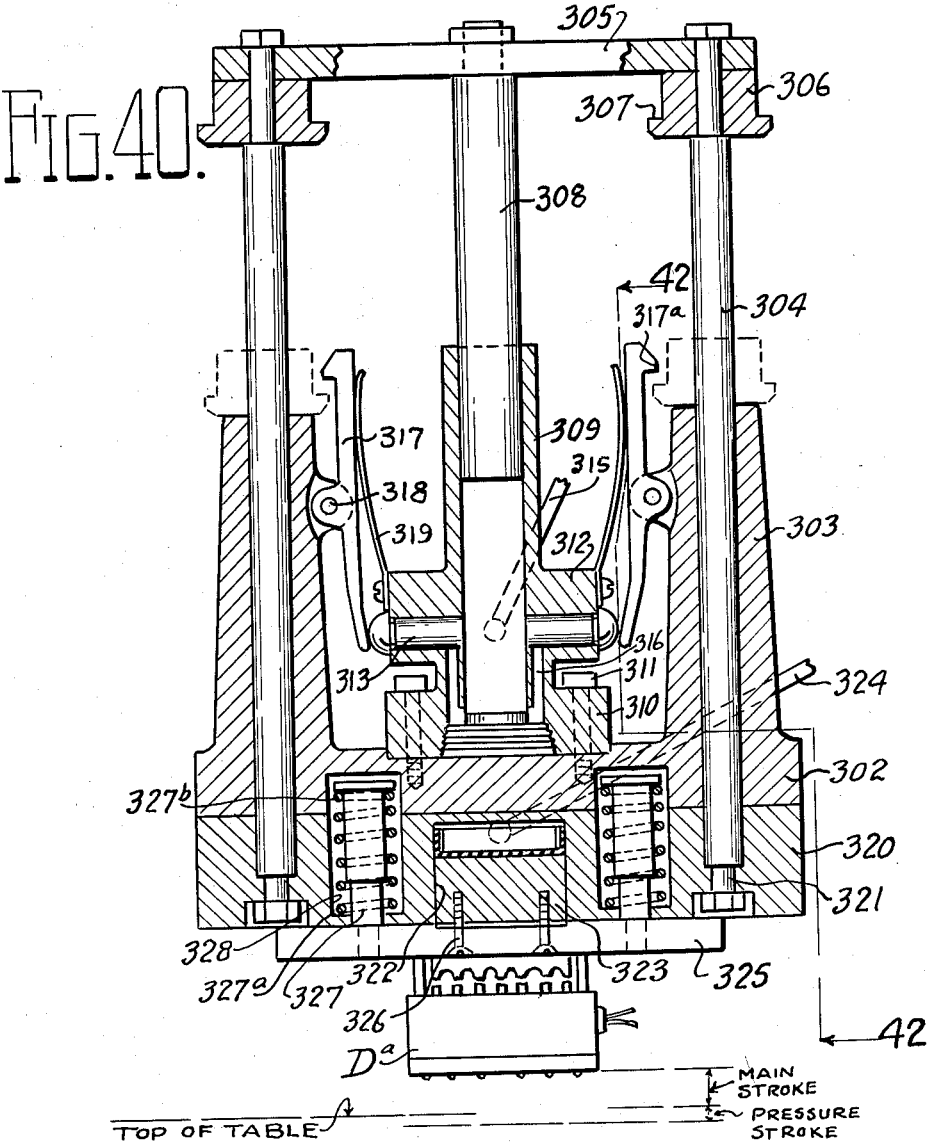

July 15, 1958 L. E. SEVISON 2,843,027
MACHINE FOR MAKING PLASTIC BOXES
Filed Jan. 10, 1952 22 Sheets-Sheet 17
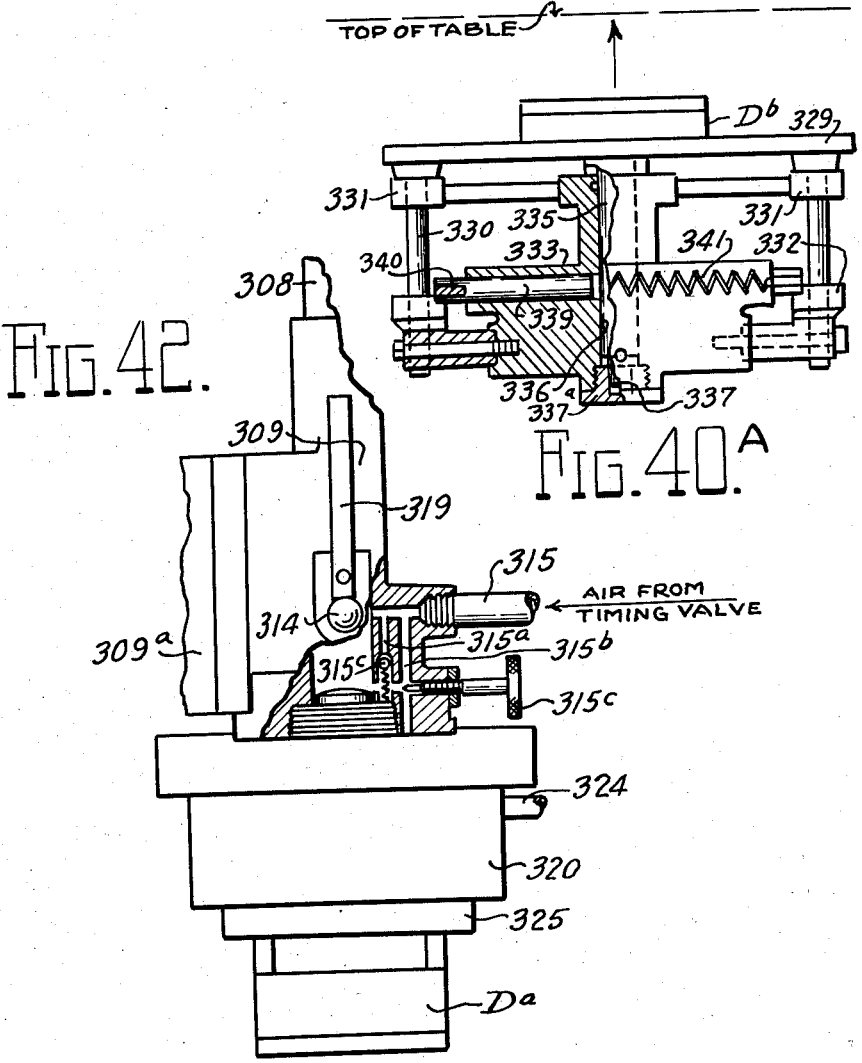
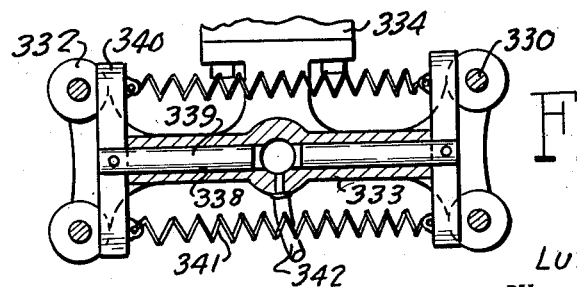
INVENTOR.
Luther E. Sevison
BY
ATTORNEY

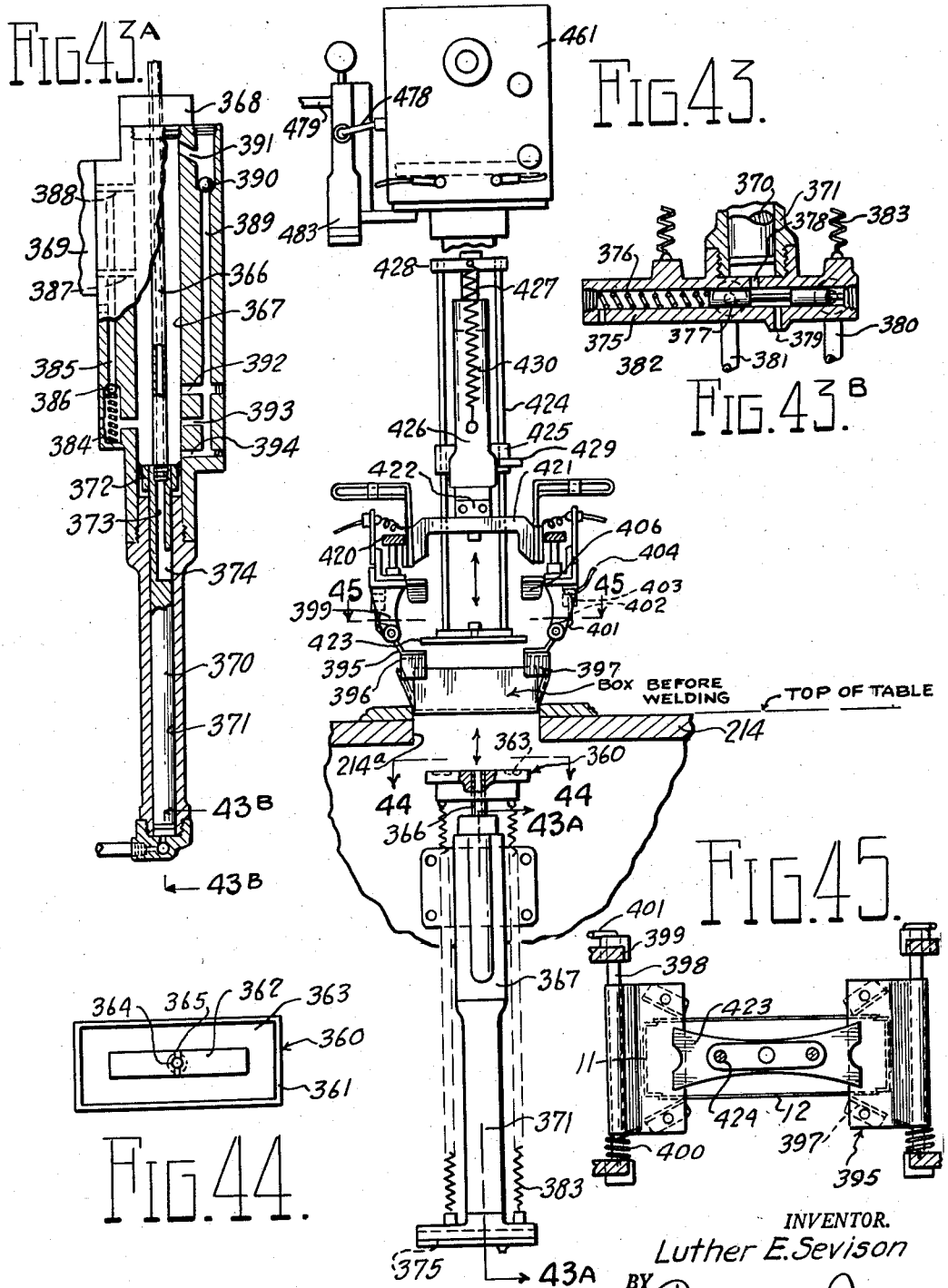

July 15, 1958 L. E. SEVISON 2,843,027
MACHINE FOR MAKING PLASTIC BOXES
Filed Jan. 10, 1952 22 Sheets-Sheet 19
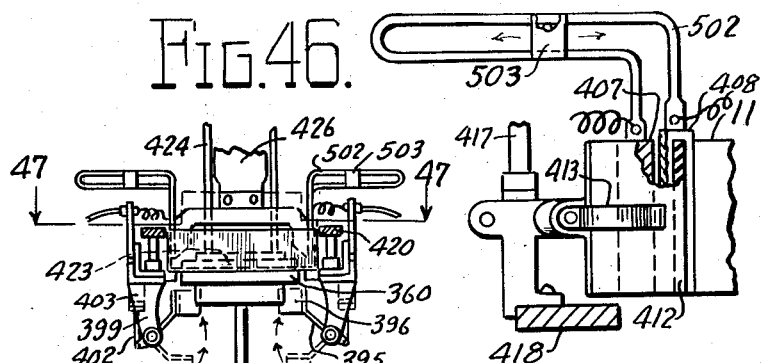
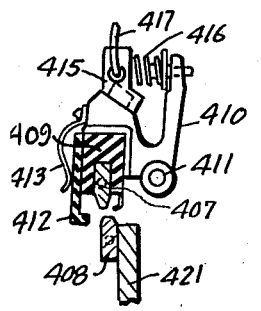
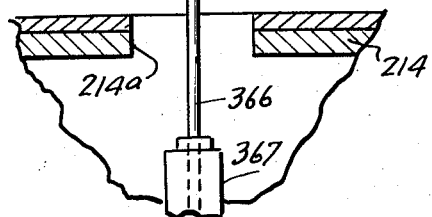
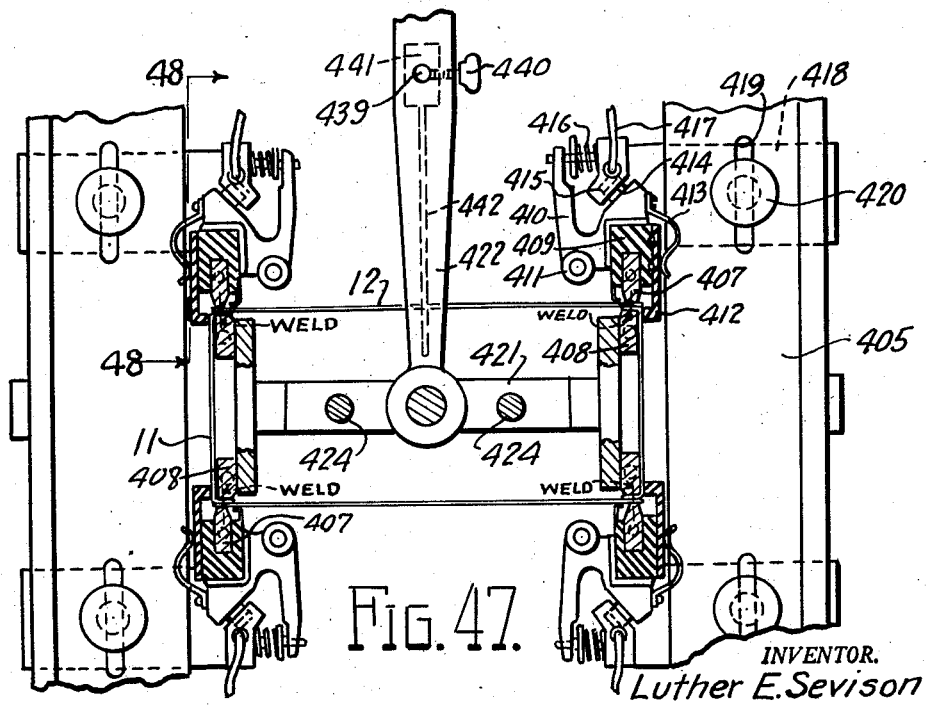
INVENTOR.
Luther E. Sevison
BY
ATTORNEY July 15, 1958  L. E. SEVISON  2,843,027
MACHINE FOR MAKING PLASTIC BOXES
Filed Jan. 10, 1952  22 Sheets-Sheet 20

INVENTOR.
Luther E. Sevison
BY
ATTORNEY

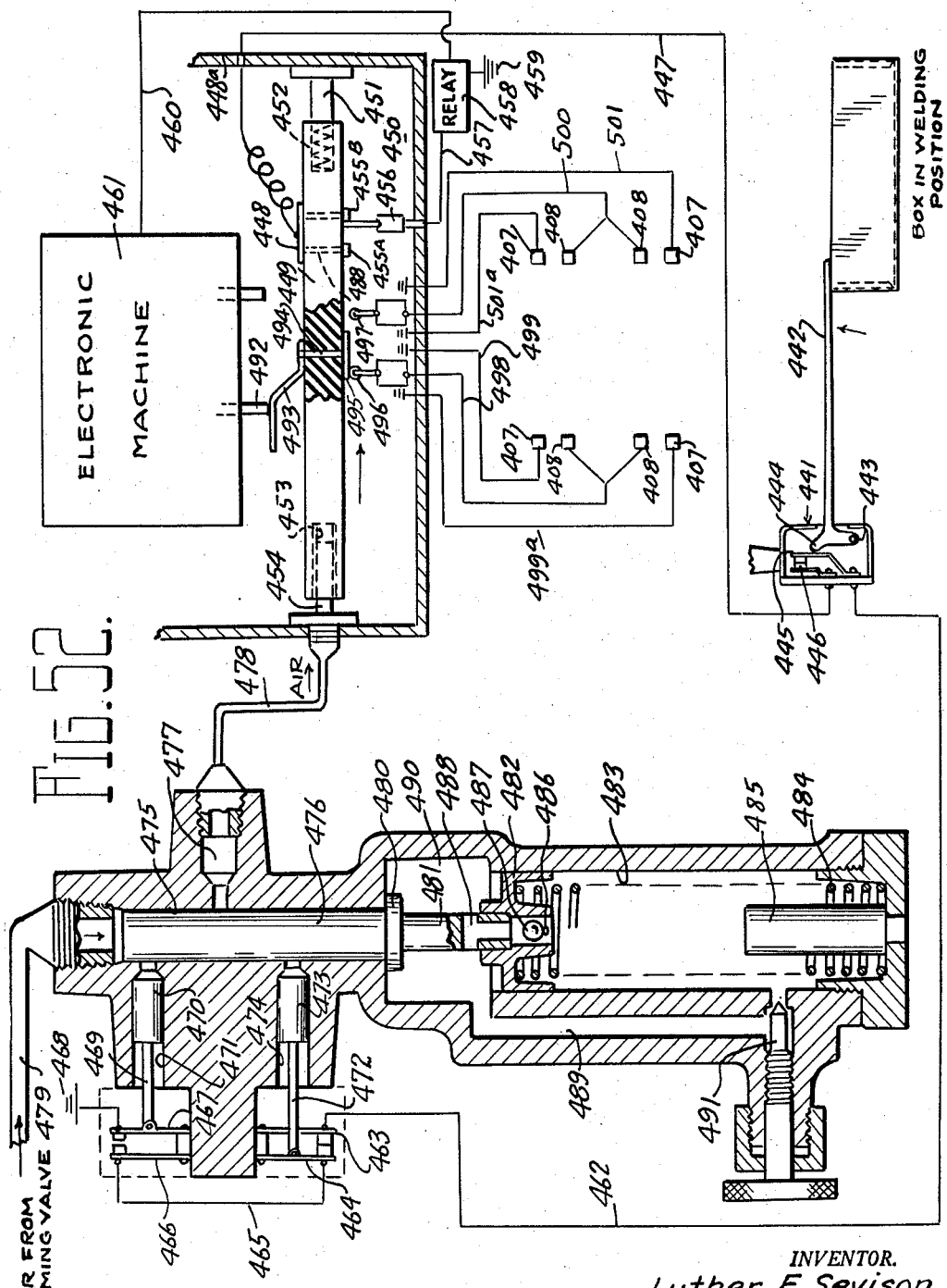

July 15, 1958 L. E. SEVISON 2,843,027
MACHINE FOR MAKING PLASTIC BOXES
Filed Jan. 10, 1952 22 Sheets-Sheet 22
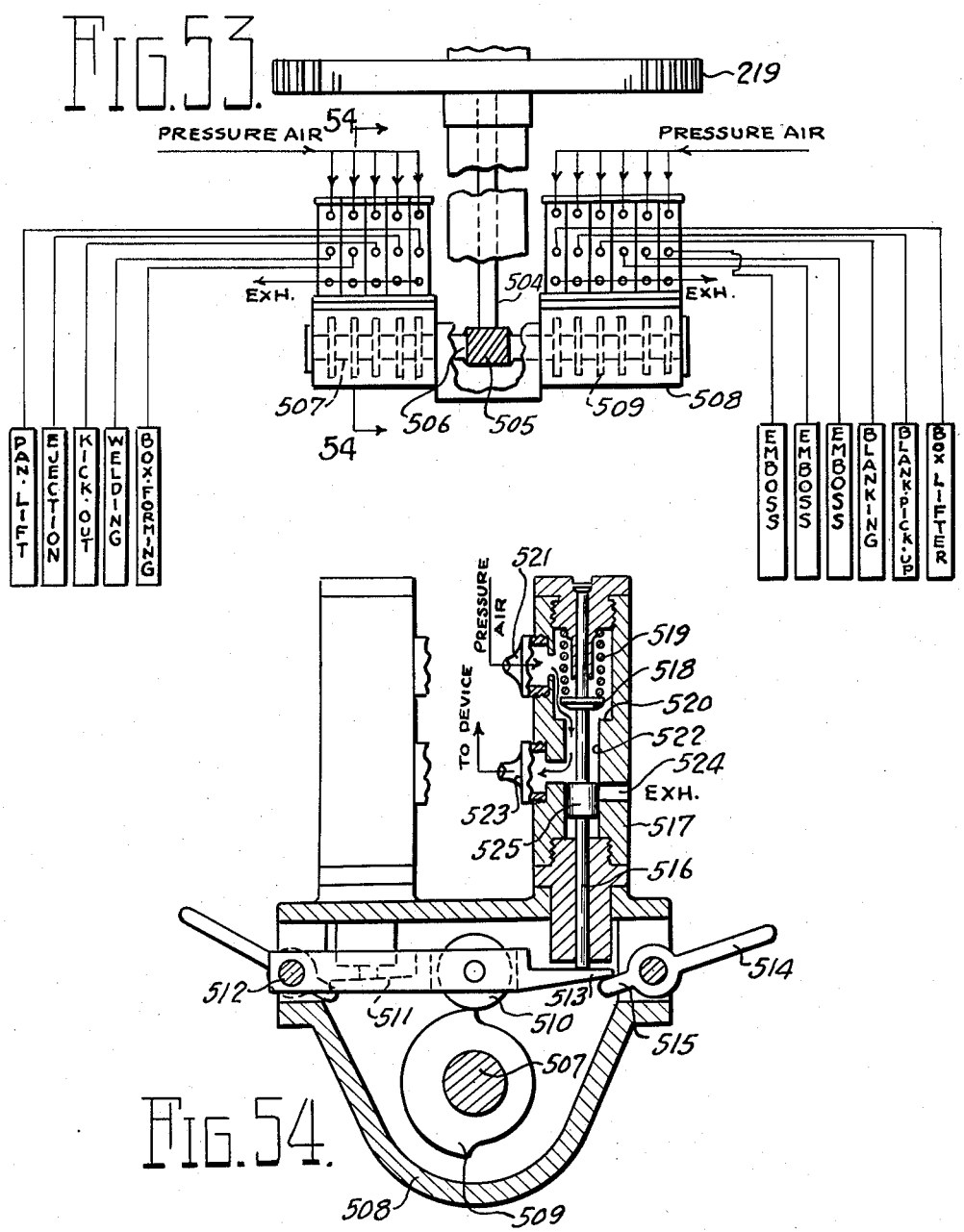

United States Patent Office 2,843,027
Patented July 15, 1958

2,843,027
MACHINE FOR MAKING PLASTIC BOXES

Luther Earl Sevison, Toledo, Ohio, assignor, by mesne assignments, to E. G. Staude Manufacturing Company, Inc., St. Paul, Minn., a corporation of New Hampshire Application January 10, 1952, Serial No. 265,734

9 Claims. (Cl. 93—45)

This invention relates to box making machinery, but particularly to machines for making boxes from thermoplastic sheet material.

An object is to produce a machine for making boxes on a large quantity basis from plastic material of the order of cellulose acetate.

Another object is to produce a machine for automatically making boxes having a bottom, side and end walls from thermoplastic sheet material.

A further object is to produce a machine for making boxes of thermoplastic material in which the contiguous walls of the box are homogenously united.

A still further object is to produce a box making machine for producing boxes on a large quantity basis and embodying mechanism for handling the sheet material from a supply roll in such manner that the sheet is perfectly flat and free from curls.

A still further object is to produce a box making machine embodying intermittently operable feeding mechanism for advancing a continuous strip of sheet material, severing a section from the continuous sheet, and then blanking the severed section to a form suitable for a box.

A still further object is to produce in a box making machine vacuum pick-up mechanism by which a box blank is held by suction to a pick-up device which then delivers the blank to a turntable on which the folding operations are performed and the contiguous walls of the folded box are united.

A still further object is to produce for use in a box making machine a jig so constructed and arranged that the box blank may be forced by plunger means into the jig for successively effecting the desired wall folding operations.

A still further object is to produce a box making machine embodying a turntable to which movement is intermittently imparted, the box folding operations being successively performed during the dwell in the movement of the turntable and the contiguous walls of the box being homogenously united at another stage during the dwell in the movement of the turntable.

A still further object is to produce new and improved mechanism for intermittently rotating a turntable and positively locking the turntable after each indexing movement has been accomplished, thereby to insure that the turntable will be held stationary after each increment of rotation.

A still further object is to produce new and improved plunger mechanism for use in box folding operations, the construction and operation being such that the plunger moves rapidly to its work and then moves slowly during the working period, hydraulic checking mechanism insuring that this movement is achieved, and after the work has been performed, the mechanism moves abruptly away from the work.

A still further object is to produce new and improved embossing mechanism for plastic boxes, embodying heated embossing dies which are movable to engage opposite sides of the wall of the box to be embossed, the mechanism being in the main pneumatically operated, the upper die being latched in working position and the lower die being positively backed up to receive the thrust from the upper die at the time of embossing.

A still further object is to produce novel welding mechanism for welding the contiguous walls of the plastic box in such manner that first one end is welded and then the opposite end is welded, provision being made to insure that the welds at one end are identical to those at the opposite end.

A still further object is to produce new and improved mechanism for delivering and guiding a plastic box to the welding mechanism and to insure that the walls of the box are properly disposed relative to each other when the box is delivered to the welding mechanism.

Other objects and advantages of the invention will hereinafter appear, and for purposes of illustration but not of limitation, an embodiment of the invention is shown on the accompanying drawings, in which Figure 1 is a side elevation of the box making machine;

Figure 2 is a diagrammatic view showing the thermoplastic sheet material being delivered from a supply roll to the heated roll which forms a part of the decurling mechanism;

Figure 3 is a diagrammatic view showing the section severed from the continuous strip of plastic sheet material;

Figure 4 is a plan view of the box blank which is formed from the section shown on Figure 3;

Figure 5 illustrates the next step in the forming of the box and is a plan view showing the tabs bent upwardly from the end walls of the box blank;

Figure 6 is a perspective view showing the end walls folded inside of the side walls of the box;

Figure 7 is a plan view of the folded box blank showing an embossing on the bottom wall thereof;

Figure 8 is a perspective view of the finished box after the tabs have been welded to the adjacent side walls;

Figure 9 is a side elevation of the decurler mechanism for the plastic sheet;

Figure 10 is a fragmentary side elevation, with some parts broken away for purpose of clarity, showing a portion of the decurler and particularly the driving roll and heating elements, taken on the line 10—10 of Figure 9;

Figure 11 is a fragmentary side elevation on the line 11—11 of Figure 9;

Figure 12 is a transverse sectional view on the line 12—12 of Figure 9, showing the floating roll and associated parts;

Figure 13 is an enlarged vertical sectional view on the line 13—13 of Figure 11;

Figure 14 is a wiring diagram for the heating elements by which the plastic sheet is heated during the decurling operation;

Figure 15 is a fragmentary top plan view showing the table over which the plastic strip passes, the adjustable guides therefor, and the incher feed mechanism;

Figure 16 is a top plan view of the blanking mechanism;

Figure 17 is a side elevation of a portion of the machine including the incher, blanking mechanism, vacuum pick-up and the turntable;

Figure 18 is a fragmentary view showing the incher feed and feeding mechanism for advancing the sheet to the blanking mechanism;

Figure 19 is an enlarged transverse section view on the line 19—19 of Figure 18, showing the gripper mechanism and associated parts;

Figure 20 is a fragmentary view showing the operating mechanism for the punch and associated parts;

Figure 21 is an enlarged transverse sectional view on the line 21—21 of Figure 20;

Figure 22 is a diagrammatic view of the sheet feeding and severing mechanism and associated operating and control devices;

Figure 23 is a fragmentary vertical sectional view of the vacuum pick-up device which operates to pick up a box blank and deliver it to a jig on the turntable;

Figure 24 is a vertical sectional view of one of the vacuum pick-up heads showing the parts in the position prior to discharge of the blank to the jig on the turntable;

Figure 25 is a top plan view of the turntable with the several jigs thereon and indicating the different stages in the handling, folding and welding of the box blank;

Figure 26 is a transverse sectional view on the line 26—26 of Figure 25;

Figure 27 is a sectional view on the line 27—27 of Figure 25;

Figure 28 is a top plan view of the simulated Geneva mechanism for actuating the turntable in step by step manner;

Figure 29 is a side elevation of the part shown on Figure 28;

Figure 30 is a plan view showing the drive mechanism for the turntable;

Figure 31 is a fragmentary top plan view showing the simulated Geneva wheel unlocked and free to be driven by the rotating disc;

Figure 32 is a front elevation of the folding mechanism for the tabs on the end wall of the box blank, taken on the line 32—32 of Figure 25;

Figure 32A is a vertical sectional view on the line 32A—32A of Figure 32;

Figure 33 is an end view substantially on the line 33—33 of Figure 32;

Figure 34 is an enlarged sectional view showing one of the heated blades effecting the tab folding operation;

Figure 35 is a vertical sectional elevation on the line 35—35 of Figure 32;

Figure 38 is a sectional view showing the folding of the end walls of the box blank;

Figure 39 is a sectional view showing the folding of the side walls following the folding of the end walls of the box blank;

Figure 40 is a vertical sectional view of the embossing mechanism which appears above the turntable and is taken on the line 40—40 of Figure 25;

Figure 40A is a view partly in side elevation and partly in section showing the parts of the embossing mechanism disposed beneath the turntable;

Figure 41 is a transverse sectional view of the mechanism shown on Figure 40A showing particularly the plungers and spring-tensioned cross plates;

Figure 42 is a fragmentary view partly in elevation and partly in section taken on the line 42—42 of Figure 40;

Figure 43 is a side elevation of the welding mechanism and associated parts and taken substantially on the line 43—43 of Figure 25;

Figure 43A is an enlarged vertical sectional view substantially on the line 43A—43A of Figure 43;

Figure 43B is an enlarged sectional view on the line 43B—43B of Figure 43A;

Figure 44 is a top plan view of the lifting pad and is taken on the line 44—44 of Figure 43;

Figure 45 is a transverse sectional view on the line 45—45 of Figure 43;

Figure 46 is a fragmentary view partly in section showing the pan in position to deliver a box to the welding mechanism;

Figure 47 is an enlarged transverse sectional view substantially on the line 47—47 of Figure 46;

Figure 48 is a fragmentary elevational view substantially on the line 48—48 of Figure 47, showing the tuner mounted in position;

Figure 49 is a fragmentary sectional view showing particularly a movable electrode in its inoperative position;

Figure 52 shows the wiring diagram for the welding apparatus and also a longitudinal sectional view of the control device which not only is effective in rendering the primary circuit complete, but also for controlling the periods of welding for the opposite ends of the box;

Figure 53 is a fragmentary view partly diagrammatic showing the timer valve mechanism and operating means for same; and Figure 54 is an enlarged vertical sectional elevation on the line 54—54 of Figure 53 showing one of the valve devices and cam operated means for same.

Figure 1:
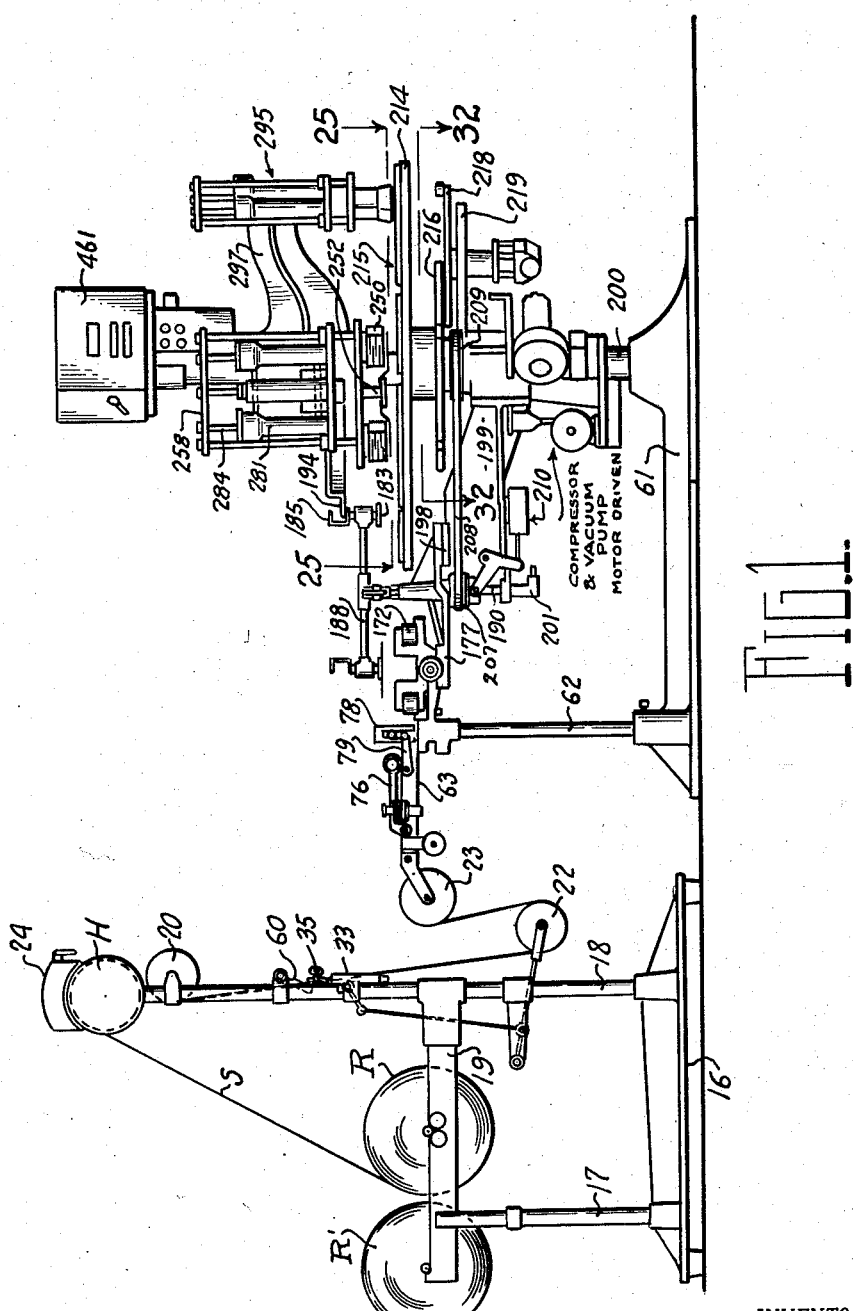
Figure 37:
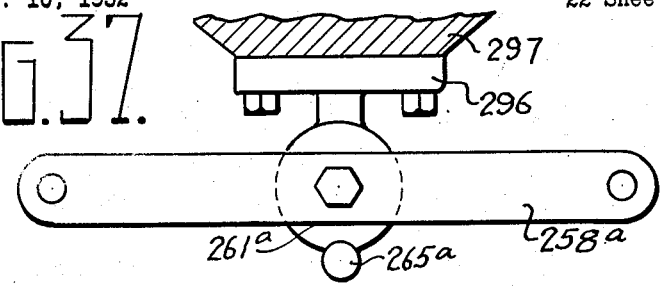
Figure 37 is a top plan view of the parts shown in Figure 36, showing particularly the manner in which the unit is mounted.
Figure 36:
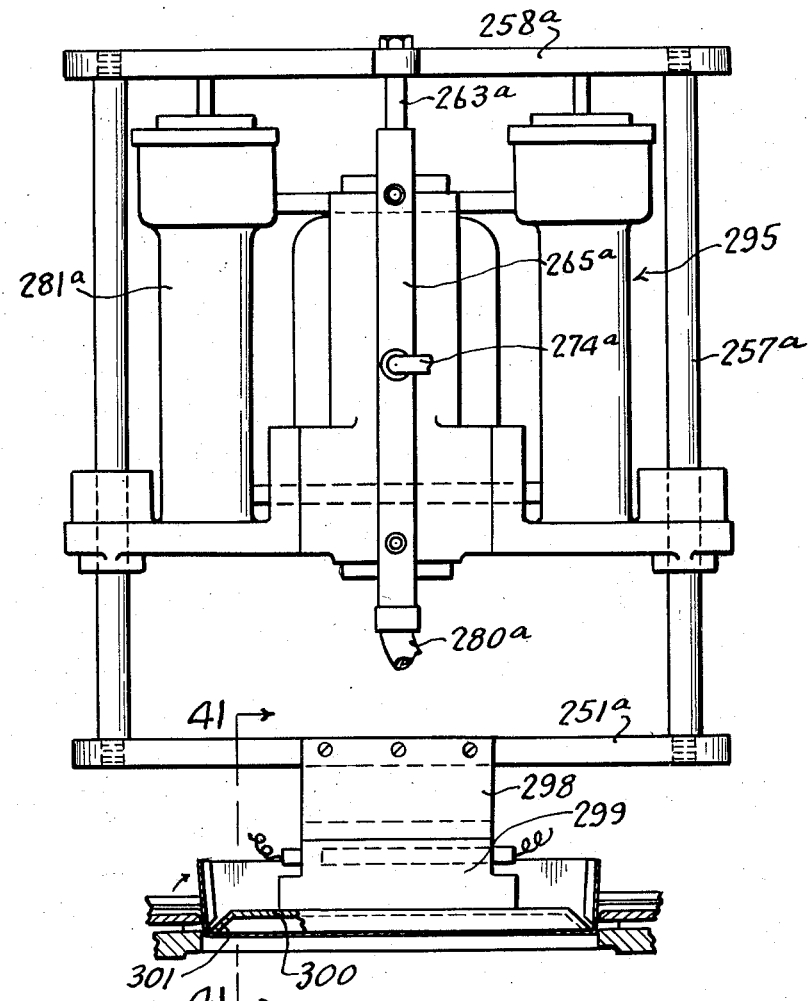
Figure 36 is a front elevation showing the mechanism for folding the end and side walls of the box and taken on the line 36—36 of Figure 25.

The illustrated embodiment of the invention comprises a machine for making boxes from plastic sheet material, such as cellulose acetate, flexible Vinylite, and other similar thermoplastic materials. These materials are particularly desirable not only because of their transparency, but also because they can be folded to the desired shape by the application of heat; also because they lend themselves to welding, which is employed to close and seal the corners of the box.

From the general aspect, the plastic sheet material in this instance, is in roll form and the strip from the roll is first fed to a decurler, which straightens out the sheet so that when it is delivered to the machine for blanking operation, it is flat and can be properly and satisfactorily handled. From the decurler a continuous strip of plastic sheet material is fed in a step-by-step manner to a mechanism which performs the blanking operation. The blanks are successively fed or delivered to a table which has a step-by-step rotary motion. On the table is a series of jigs which are rigid with the table and move with it. It may be said that a blank passes through five stages and these stages may be briefly described as follows:

In the first stage the blank is delivered to a jig. In the second stage, after the table has indexed to a predetermined extent, four tabs are bent or folded upwardly from the blank. In the third stage, the side walls are folded upwardly, relative to the bottom wall of the blank, the tabs being arranged on the inside between the side and end walls of the box. In the fourth stage and after a further indexing movement of the table, the bottom wall of the box is embossed in a desired or predetermined manner. In the final or fifth stage, and after a further indexing movement of the table, the tabs are welded, the box thus being finally formed and closed and then ejected from the machine.

Referring to Figures 2 and 8, it will be understood that the supply roll of plastic sheet material from which the box is formed, has its free end passed over a heated roll H, which is a part of the decurling apparatus which will be more fully explained hereafter. From this continuous strip S of sheet material, a section S' is severed, that section being of a predetermined size sufficient for blanking operations. From the severed section S', the box blank B is produced from suitable punches and dies. As shown, the blank B has a bottom wall 10, oppositely disposed end walls 11, and a pair of oppositely disposed side walls 12. It will be observed that between the end walls 11 and the bottom wall 10, at each corner or side of the end walls are notches 13. In the succeeding steps or stages in forming the plastic box, the first operation is that of bending upwardly the tabs 14, one on each side of each of the end walls 11, the notches 13 enabling this folding action to be readily effected. In the next stage, after the tabs 14 have been folded, the end walls 11 are folded toward each other to a position at about 90° to the bottom wall 10 of the box, this being shown in Figure 6 of the drawings. After the upward folding of the end walls 11 of the box, the side walls 12 are then folded upwardly so that the tabs 14 lie inside of the side walls 12. In the next step or stage, the bottom wall 10 of the box is embossed, as indicated at 15 on Figure 7, it being understood that any suitable embossing may be effected such as is desired for advertising or other purposes. In the final stage and, as shown on Figure 8, the tabs 14 are welded to the side walls 12 thereby completing the formation of the sealing of the structure.

The apparatus for decurling the continuous strip of sheets from the supply roll is shown particularly on Figures 9 to 14 and comprises a standard, having a base 16 from which rises a pair of laterally spaced posts 17 arranged rearwardly of the base 16. Adjacent to the front end of the base 16 rises a pair of laterally spaced columns 18 of tubular form, which extend vertically a substantial distance beyond the posts 17. Connected to and supported by posts 17 and columns 18 are horizontal supports 19 on which the roll R is suitably mounted for turning movement. As shown, spaced rearwardly of the supply roll R is a reserve roll R' which can be placed in use when the supply roll R is exhausted.

From the supply roll R the strip S extends upwardly and about the heated roll H, thence downwardly and inwardly over a guide roll 20, which is carried by brackets 21 secured to the upper portions of the columns 18. From the guide roll 20 the strip extends downwardly to a floating roll 22. Arranged between the guide roll 20 and the floating roll 22 is a pair of laterally spaced curved guide fingers suitably carried by the columns 18. These fingers engage opposite edge portions of the strip S as the latter advances and are so shaped to trough or cause the edge portions of the strip to be given a reverse curl lengthwise of the sheet, for the purpose of assisting in straightening out the continuous sheet and to obtain a strip, which is as flat and free from undulations and curls as is possible.

From the floating roll 22 the strip S passes over a guide roll 23 to the feeding mechanism of the machine hereinafter to be described. Suffice it to say at this time that the feeding mechanism operates in a step-by-step manner whereby the strip S is pulled for a predetermined distance after which the feed remains quiescent until the next successive pull or advancing movement imparted to the sheet.

Spaced above the roll H is a canopy 24 which is arcuate in cross section and carries on its under surface an electrical heater for supplying radiant heat to the strip S as it passes over the roll H. As shown in Figure 14, the heater 25 has three sets of heating units 25A, 25B and 25C, these being of varying resistances in order to generate varying degrees of heat in accordance with the demands of service. The particular electrical arrangement forms no part of this invention. Suffice it to say that a main switch 26 is electrically connected to a relay 27 suitably connected through the switches leading to the individual groups of heating coils. Current is supplied from the lines 28 and 29, and by actuating the main switch 26 and one or another of the switches for the respective units 25A, 25B and 25C, the proper or desired radiant heat for the roll H may be readily obtained.

The exterior of the roll H is covered by cloth to provide a relatively soft surface over which the strip S may pass freely without scratching it. The roll H is of substantial size and disposed within the roll and suitably connected for driving it is an air engine 31 of the piston and cylinder type. Since air engines of this type are well known in the art and since the particular construction forms no part of this invention, detailed description thereof is not considered necessary. Air under pressure is supplied to the air engine 31 by a tube 32 which extends downwardly to the lower end of a valve housing 33 suitably clamped to one of the columns 18 about midway of its height. Air under pressure is supplied to the upper end of the valve housing 33 through a tube 34 from a suitable source, a manual valve 35 being disposed adjacent the upper end of the valve housing 33 for controlling the introduction of compressed air to the housing.

Referring particularly to Figure 13, a passage 36 extends vertically through the housing 33 and arranged within this passage is a poppet type valve 37, which is vertically reciprocable toward and away from a valve seat 38. Connected to the underside of the valve 37 and depending therefrom is a tapered rod 39 constituting a metering valve. The metering valve 39 passes through a sleeve 40 and the further upwardly the metering valve 39 moves relative to the sleeve 40, the greater will be the amount of air which is allowed to pass between the valve and the sleeve 40. A passage 41 connects the portion of the passage 36 above the sleeve 40 with that portion of the passage below the sleeve and a manually operated needle valve 42 controls the passage of air through the passage or bypass 41. Connected to the lower end of the metering valve 39 and depending therefrom is a guide rod 43 which passes loosely through a tubular guide 44. Connected to the upper end of the valve 37 is a rack 45 and at the upper end of the rack 45 extends a vertically disposed rod 46 which passes loosely through a guide 47'. Meshing with the teeth of the rack 45 is a pinion 47 which is oscillatably mounted in a cavity formed in the valve housing 33.

Fixed to the pinion shaft on the outside of the housing 33 is an operating arm 48 and pivoted to the free end of the arm 48 is a depending link 49. The lower end of the link 49 is pivoted to an arm 50 which is mounted upon and fixed to a transverse shaft 51. The transverse shaft 51 has its end portions rotatably mounted in transverse bracket arms 52, the inner ends of which are clamped to the upright columns 18. Fixed to the end portion of the shaft 51 is a knurled operating wheel 53 to enable the wheel and shaft 51 and associated parts to be moved by hand, when so desired.

Fixed to an intermediate portion of the shaft 51 is an arm 54 which projects forwardly towards the columns 18 and rigid with its opposite end is a yoke 55 carrying the floating roll 22. In order to counterbalance the weight of the roll 22 and associated parts, a torsional spring 56 has one end fixed to one of the bracket arms 52, is wound about the shaft 51 and has the opposite end fixed to the shaft, as indicated on Figure 12.

Fixed to the shaft 51 adjacent to the arm 50 is a relatively short arm 57 which cooperates with a switch 58. When the roll 22 falls downwardly upon release from the strip S, due for example, to breakage of the strip or completion of the supply on the roll R, the limit switch will act to shut off the heater 25. This will appear more fully later on.

As the strip S passes over a heater roll H, the proper degree of heat which is empirically determined is radiated by the heater 25 so that the plastic strip S is rendered more pliable and is in the desired condition for decurling. It will be noticed that the strip as it leaves the heater roll H is directly given a reverse bend as it passes over the guide roll 20 restoring the strip to a substantially flat condition. Since there is a tendency of the side edge portions of the strip to curl, the strip then passes between the guide fingers 60 which creates a trough-like effect and is found to eliminate curling difficulties lengthwise of the sheet.

Advancing movement is imparted to the strip S causing it to unwind from the roll R by the operation of the air engine 31. Inasmuch as the subsequent mechanism imparts a step-by-step movement to the strip S and is not in the nature of a continuous uniform feed, it is necessary that the air engine 31 operate at different rates of speed. It will be apparent that the operation of the air engine 31 is controlled by the movement of the floating roll 22 and when a pull is exerted on the strip S by the mechanism in advance of the guide roll 23, the floating roll 22 is caused to swing upwardly, such, for example, as to the broken line position shown in Figure 9. When this action takes place, through the connections described, it will be understood that the metering valve 39 (Figure 13) is moved vertically upward allowing a greater volume of air under pressure to pass to the air engine. On the other hand, when the floating roll 22 moves downwardly, through the action of the metering valve 39, the volume of air to the air motor 31 is gradually reduced, thereby slowing up the air engine. In the event that the strip should break or for other reasons the floating roll 22 drops to its lowermost position, the valve 37 is then moved to its seat 38, cutting off the flow of compressed air to the air engine. At the same time, the limit switch 58 will be actuated to shut off the operation of the heater. A predetermined amount of compressed air can be bypassed through the bypass 41 on manipulation of the valve 42 for supplementing the volume of air permitted to flow by the metering valve 39.

Referring to Figure 1, the box machine is formed with a base 61 and from the rear end portion of the base rises a supporting post 62, on the upper end of which is mounted a table 63. As shown on Figure 15, a pair of laterally spaced elongate finger-like guides 64 are mounted on the table 63 for guiding the advancing movement of the strip S. The guides 64 are provided at their forward ends with inwardly inclined spring fingers, which press lightly upon the top surface of the sheet S. The strip guides 64 have transversely extending guide strips 66 and each strip 66 is secured to the underside of one of the guides 64 and extends transversely of the table beneath the other guide 64. These guide strips 66 are slidable transversely of the table in ways 67. Ribbons 68 are secured at one end respectively to the free ends of the guide strips 66, pass around sheaves 69 disposed at the opposite sides of the table and thence extend to the adjacent guide 64 to which they are attached. Disposed above the sheaves 69 and fixed thereto is a knurled knob 69' to enable manipulation of the guides. The arrangement is such that the guides 64 are conjointly shifted by turning the knurled knob 69' so that the guides 64 may be moved away from each other or toward each other thereby to effect convenient adjustment relative to the side edges of the strip S.

For imparting recurrent advancing movement to the strip S for a relatively short distance, a feeder or incher 70 is provided and consists of pairs of vertically aligned friction rolls for gripping the strip S therebetween, as shown in Figure 15. The incher includes a transverse shaft 71 on which are fixed for rotation a pair of rubber covered rolls 72. On one end of the shaft 71 is a knurled manual operating knob 73 and at the opposite end is an actuating gear 74. As shown on Figure 17, the gear 74 meshes with a gear 74' on a similar shaft-roller-arrangement disposed beneath the table, the latter being identified by the reference numeral 75 on Figure 22. As shown on Figures 1 and 15, the shaft 71 is rotatable at its opposite end portions in bracket arms 76, the opposite ends of which are pivotally connected to the sides of the table 63.

It will be understood that the incher 70 advances the strip of plastic sheet material a short distance sufficient to enable certain gripping elements to engage it and advance it further to the blanking stage, as will hereinafter be described. After the strip has been advanced a sufficient distance suitable for a blank, that portion is severed from the continuous strip by a cutoff mechanism now to be described. A transversely arranged vertically reciprocable knife carrying crosshead 77 is guided in its vertical movements by upright guides 78 supported by the table 63. The crosshead 77 is reciprocated by an actuating arm 79 which is secured to a transverse shaft 80 at one end, the opposite end being connected to the crosshead by a link 81. Thus it will be apparent that by a rocking movement of the shaft 80 the crosshead 77 may be moved downwardly or upwardly and in its downward movement it severs a section from the continuous strip S of plastic material.

Referring particularly to Figure 22, it will be understood that after the incher 70 has advanced the continuous strip S of sheet material a short distance beyond the cutoff 77, a reciprocatory feeding device grips the advanced edge of the sheet and pulls it forwardly for a distance suitable for a box blank. Thereupon the cutoff operates to sever that section from the continuous strip S. As shown a carriage 82 is adapted to reciprocate horizontally toward and away from the cutoff 77. The carriage 82 is guided in its to and fro movements by a guide platform 83, forming an advanced portion of the table 63. On the upper portion of the carriage 82 is a notched head 84 adapted to receive the forward free end of the strip therein. As indicated on Figure 19, the notched head 84 has an intermediate recess in which a pivoted clamping or gripping plate or finger 85 operates. The clamping or gripping plate 85 is pivotally mounted at 86 at its rearward end and has a depending actuating arm 87, the lower end of which is in the form of a yoke to straddle a spool 88. The spool 88 forms a part of an elongate piston rod 89 which, as shown on Figure 22, has a piston 90 at one end mounted for reciprocation within a cylinder 91. At the opposite end of the piston rod 89 is a piston 92 which, as will hereinafter appear, operates to release the gripping or clamping plate 85. The piston 92 operates within a cylinder 93 forming an integral part of the carriage 82, one end of the cylinder 93 being open and the opposite end being provided with a port 94.

Carried centrally by the reciprocable carriage 82 is a latch arm 95 and fixedly associated with the arm 95 is a bell crank arm 96 which depends from the lower end of the carriage 82 and carries at its free end a roller 97. The roller 97 is adapted to ride along a horizontal track 98 which has integral laterally extending supporting arms 99 secured at their free ends to a horizontally disposed rock shaft 100. Secured to one end of the shaft 100 is a lever 101 to the free end of which is pivoted an upstanding arm 102. The upper end of the arm 102 is slidable through an apertured end portion of a lever 103, the opposite end of which is secured for turning movements with the shaft 80. On the upper end portion of the upstanding arm 102 is fixed a disc 104 which is adapted to be engaged by the arm 103 upon clockwise movement of the shaft 80 thereby to rock the shaft 100 and the track 98 for imparting counterclockwise movement to the arm 96 and thereby lifting the latch arm 95 for a purpose which will hereinafter appear.

Secured to the shaft 80 and depending therefrom is a relatively long operating arm 105 to the lower end of which is pivoted a piston rod 106 which has a piston 107 reciprocable within a cylinder 108, a coil spring 107a being arranged between the piston and the outer end of the cylinder. As will appear as the description proceeds, air under pressure is supplied to the piston 107 for actuating it and through the connections described operating the cut-off 77 to sever a section from the continuous strip S. Arranged underneath of the path of travel of the carriage 82 is a block 109 which is provided at its upper portion with a vertical wall 110 constituting a stop surface against which the latch arm 95 is adapted to abut. The block 109 is threadedly mounted on a horizontal screw threaded shaft 111 which may be manually adjusted for predetermining the position of the block 109 as by an extension rod 111' and associated mechanism (Figure 18). The connection between the screw shaft 111 and its supporting brackets 111a is such as to afford a limited longitudinal movement so that the shaft can move slightly horizontally relatively to its support.

Engageable by one end of the shaft 111 is a vertically disposed lever 112 which is pivoted intermediate its ends at 113. Engaging the opposite end of the lever 112 is a horizontally disposed valve rod 114 which has a poppet type valve 115 at its opposite end, the latter seating within a housing 116. Pressure in the form of compressed air is supplied to the valve housing 116 at one side of the valve 115 from a tube 117. The opposite side of the housing 116 communicates with the cylinder 108 through a passage 118.

For effecting advancing movement of the piston 90 and associated parts, a tube 119 delivers compressed air to the left hand end of the cylinder 91 (Figure 22) and for effecting retracting movement of the piston 90 a tube 120 delivers compressed air to the right hand end of the cylinder 91. Both the tubes 119 and 120 extend to a relay valve housing 121 and within the housing 121 is a relay valve 122 which is horizontally reciprocable and has piston-like heads 122a, 122b, 122c and 122d. Leading to a relay valve housing 121 is a tube 123 which leads from a source of air under pressure. Provided in the housing 121 are exhaust ports 124 and 125, the port 124 being arranged to the right of the tube 120 and the exhaust 125 being disposed to the left of the tube 119. For controlling the volume of air under pressure supplied to the cylinder 91 through the tube 119, there is arranged in the line a manually operated needle valve 126, the adjustment of which controls the speed of advancing movement of the piston 90. Connected to opposite sides of the valve 126 is a ball valve controlled bypass 127 which seats when air under pressure is being delivered through the tube 119 to the cylinder 91 for advancing the piston 90 but which opens when the cylinder 91 is being exhausted of its air upon movement of the piston 90 to the left of the cylinder or during the retracting movement of the piston. A similar manually operated needle valve 128 is disposed in the line or tube 120 for controlling the speed of movement of the piston 90 during its retracting movement.

Leading from the right hand end of the relay valve housing 121 is a tube 129 which extends to a housing 130 for the main control valve. Extending from the left hand end of the relay housing 121 is a tube 131 which similarly extends to the control valve housing 130. Within the housing 130 is a piston-like control valve 132 which is carried by an elongate stem or pin 133 slidable in the housing 130, the ends of the pin projecting beyond opposite ends of the housing. Leading to the housing 130 intermediate the tubes 129 and 131 is a tube 134 which supplies air under pressure from any suitable source such, for example, as a pressure tank. It will be understood that when the valve 132 is in its left hand position compressed air from tube 134 may flow to the tube 129. When the valve 132 is in its right hand position then the tube 129 is shut off and compressed air flows from the tube 134 to the tube 131.

Secured to one side of the housing 130 is an extension 135 in which a piston 136 is slidable horizontally, the piston 136 having a projecting portion for engaging the adjacent end of the valve stem or pin 133. A coil spring 137 is interposed between the end of the housing 130 and the piston 136 for urging the latter toward the left or in a direction away from the housing 130. Leading to the housing extension 135 for delivering air under pressure for actuating the piston 136 to the left of Figure 22 is a tube 138 which extends from a timer valve which will be hereinafter described.

For actuating the incher 70 and, as shown on Figure 22, a piston-like rod 139 has its opposite end portions reciprocable within cylinders 140 and 141. The outer end of the cylinder 140 is connected by a tube 142 to the tube 120 so that depending upon the position of the relay valve 122, air under pressure is delivered to the tube 142 and is allowed to exhaust through the exhaust port 124. Leading from the cylinder 141 is a tube 144 which connects to the tube 119 and similarly this tube receives its air under pressure from the pressure line 123 depending upon the position of the relay valve 122 and also can exhaust through the port 125 on a predetermined positioning of the relay valve. In the tube 142 is a manually controlled valve 143 for regulating the speed of movement of the piston rod 139 and similarly a manual speed regulating valve 145 is disposed in the tube 144.

Engaging a central portion of the piston rod 139 is a clamp 146 to which is pivoted one end of an arm 147. The opposite end of the arm 147 is pivoted to the outer end of a pivotally mounted pawl 148. The pawl 148 is adapted operatively to engage a ratchet wheel 149 fixed to the shaft 150 which forms a part of the shaft-roller assembly 75. It will be clear that upon movement of the rod-like piston 139 to the left of Figure 22, the ratchet wheel 149 is rotated in a clockwise direction thereby to actuate the incher 70 for advancing the continuous strip S of plastic material a short distance. This positions the free forward end of the strip S a short distance beyond the cutoff 77 and in position to be gripped by the gripping plate 85.

In the operation of the mechanism as shown on Figure 22, let it be assumed that the timer valve has operated to introduce air under pressure to the tube 138 thereby to actuate the piston 136 to the right and thereby shifting the valve 132 to its extreme right hand position, closing off the tube 129 but opening the tube 131 to the pressure line 134. Fluid under pressure from the line 131 shifts the relay valve 122 to its right hand position, enabling compressed air from the line 123 to pass through the line or tube 120 for moving the piston 90 to the left of the Figure 22 in a retracting direction. At the same time, air under pressure passes through the tube 142 to shift the piston rod 139 to the left of the figure and impart a short rotary motion to the incher through the pawl and ratchet wheel and thereby advancing the forward end portion of the continuous strip S a short distance beyond the table.

The movement of the piston 90 to the left imparts retracting movement to the carriage 82 and associated parts and this movement continues until the forward face 151 of the table is engaged by a permanent magnet 152 forming a part of the rearward face of the carriage 82. The permanent magnet 152 engages the metal surface 151 and retains the carriage in such retracted position against accidental or unwarranted movement. A pin 153 which projects rearwardly of the carriage 82 engages the outwardly projecting right hand end of the valve stem 133 and shifts the valve 132 from its extreme right hand position to its extreme left hand position, such as shown on Figure 22. When the valve 132 is in this position, air under pressure from line 134 passes through the tube 129 to shift the relay valve 122 to the extreme left hand position. When the relay valve is in this position, air under pressure from the tube 123 passes through the relay housing 121 to the tube 119 for advancing the piston 90 to the right of the figure. The first thing that happens upon such movement of the piston 90 is to actuate the clamping plate 85 through the spool 88 and actuating arm 87 to grip the portion of the sheet S advanced by the incher 70.

It will be understood that the plastic sheet S is first gripped upon the advancing movement of the piston 90 and its piston rod 89 due to the lost motion between the piston rod 89 and the carriage 82. As shown on Figure 22, the piston rod 89 can move in an advancing direction independently of the carriage 82 a sufficient amount to effect actuation of the clamping plate 85 through the movement of the spool 88 by which the arm 87 is actuated. Thus as the piston 90 continues its advancing movement to the right, the sheet S of plastic material is drawn forward. This advancing movement of the carriage 82 and sheet S continues until the latch arm 95 engages the stop 110 on the block 109, whereupon the movement is arrested.

Due to the lost motion of the shaft 111 and its supporting brackets 111a, a slight additional movement is imparted to the shaft 111 by the piston rod 89 and this movement is sufficient to rock the lever 112 to actuate the valve stem or rod 114 for unseating the valve 115. When the valve 115 is unseated, compressed air from the tube 117 passes to the cylinder 108 to force the piston 107 to the left of Figure 22 and through the connections described, actuating the cut-off 77 thereby to cut or sever a section from the plastic strip S which is, as established by the stop 110, of predetermined size sufficient from which to form the box, as will hereinafter appear. Since the movement to the left of the piston 107 compresses the coil spring 107a, the latter promptly returns the parts to their normal position, elevating the cut-off 77 above the table in position for the next succeeding cut-off operation. Compressed air immediately returns the valve 115 to its seat and sufficient clearance is afforded between the piston 107 and the walls of the cylinder 108 to allow the compressed air to bleed out past the piston, permitting the piston 107 to move to the right of the figure by the coil spring 107a.

As above pointed out, when the cut-off 77 is actuated to sever the plastic strip S, the arm 103 is rocked downwardly (Figure 22) to engage the disc 104 on the upright arm 102 and move the latter downwardly rocking the arm 101 and shaft 100 and thereby the track 98 in an upward direction, thereby to swing the arm 96 in a counterclockwise direction. Such upward movement of the arm 96 lifts the latch arm 95 away from the stop surface 110 and permits the piston 90 and its piston rod 89 to resume its advancing movement of the carriage 82 to the right of the figure, it being understood that the forward edge portion of the section severed from the plastic strip S continues to be clamped by the clamping plate 85 so that as the carriage 82 advances, the severed plastic section advances with it.

Arranged at a predetermined position for engagement by the carriage cylinder 93 substantially at the end of the advancing movement of the carriage 82 is a horizontally slidable elongate release tube 154, the free end of which is adapted to register with the port 94 in the cylinder 93. The release tube 154 is slidable within the vertical wall 155 forming a part of a compressed air housing 156 which is mounted in any suitable manner for to and fro horizontal adjustment. The release tube 154 has at its inner end an enlarged imperforate head or cap 157 disposed within the housing 156. Adjacent the head 157 is a lateral port 158 which when the release tube is in its extreme left-hand position, as shown on Figure 22, is covered by the end wall 155. Air under pressure is delivered to the housing 156 through a pressure line or tube 159, leading from a pressure tank or other source of compressed air.

When the carriage 82 is released by the latch 95 for further advancing movement, it resumes its movement to the right of Figure 22 until the outer end of the cylinder 93 engages the release tube 154, moving the latter to the right and uncovering the port 158. When the port 158 is uncovered, air under pressure from the line 159 passes through the port 158 and through the tube 154 and into the cylinder 93 through the port 94 thereby actuating the cylinder 93 and the carriage 82 to the right of the figure to cause the clamping plate 85 to be rocked to its open or releasing position through the movement of the carriage 82 and actuating arm 87. When the severed section of the plastic strip S is released, it is disposed in the proper position to be blanked.

As will hereinafter more fully appear, the timer valve again operates to introduce air under pressure to the tube 138 thereby to actuate the piston 136 to the right of Figure 22 and shift the valve 132 to its right-hand position. When the valve 132 is in the right-hand position, then the relay valve 122 is shifted to the right of the figure to cause compressed air to pass into the line 120 and impart retracting movement to the piston 90 and carriage 82. The incher 70 is again operated to advance a portion of the plastic strip S, as previously described, to a position to be engaged by the clamping plate 85 on the carriage 82 and the cycle of operation above described again takes place. It will also be understood that when the carriage 82 is moved away from the releasing tube 154, the air pressure on the head 157 will return the tube to the position shown in Figure 22 where it remains until again engaged by the end of the cylinder 93 upon the advancing movement of the carriage 82.

Referring particularly to Figure 16, the severed section of the continuous plastic strip S is delivered by the mechanism just described to the blanking mechanism which comprises punches and dies for forming the box blank, as shown on Figure 4 of the drawings. The feeding mechanism carries the severed section of the continuous strip so that portions of the latter lie above dies 160 which are arranged in pairs on opposite sides of the table guide 83. When the severed sheet section is released, its forward edge abuts adjustable stops 162, one being arranged on each side of the guide 83. These stops 162 are formed on upright plates and constitute upright extensions on these plates and are suitably mounted for longitudinal adjustment in guides suitably formed on the support. The rear edges of the severed section abut against stops 163 similarly arranged for adjustment on opposite sides of the guides 83. To insure that the sheet sections advance properly, ramp guide strips 164 are disposed in the path of travel of these severed sections. Further to insure the proper positioning of the severed section relative to the punches and dies, a pair of adjustable side positioners 165 are provided. The side positioners 165 have a screw and slot adjustment 166 so that proper adjustment of them can be made to accommodate sheets of different widths.

Each punch 161 is carried by an arm 168 which is pivotally mounted intermediate its ends on a pivot 169. Each arm 168 is tensioned by a coil spring 170 which operates to hold the punches 161 normally in their open position or in positions spaced from the respective dies 160. For operating each punch a pneumatic device is provided, and as shown on Figure 20, a piston 171 has its piston rod operating against the outer end of the arm 168, the piston 171 operating within a cylinder 172 so that when air under pressure is introduced to the cylinder 172, the piston is forced upwardly thereby to impart downward movement to the punch 161 which is carried by the opposite end of the pivoted arm. As shown on Figures 16 and 17, air under pressure is admitted to the cylinders 172 through tubes 173 which lead from a common junction connected to the timer valve mechanism hereinafter described so that all of the punches operate together.

The pairs of punches and dies on each side of the table can be conjointly adjusted either in a longitudinal or in a lateral direction to accommodate different sized sheets. As shown, a screw-threaded shaft 175 provides for lateral adjustment of a pair of punches and dies. On the outer end of each of the shafts 175 is a hand wheel 176 and suitable guideways 177 support the punch and die assemblies for such adjustment. Lateral adjustment of each pair of punch and die assemblies is made possible by a screw shaft 178 which has a hand wheel 179, guideways 180 being provided for this purpose. From the above description, it will be manifest that the pairs of punches and dies can be readily and conveniently adjusted to the desired position depending upon the size of the sheet being handled.

The punches and dies are constructed to cut the corners of the sheet to form the notches 13 in the box blank as indicated on Figure 4. As shown on Figure 21, each punch has a corner projection 181 for this purpose, and the dies receiving the punches are accordingly formed with notches. After the corner portions have been cut from the sheet, the severed portion or scrap is blown from each die by air under pressure introduced through the tubes 182, the distributor valve mechanism 174 operating to deliver a puff of air to each of the units as soon as the corners of the blank have been severed.

After each box blank 10 has been formed, it is picked up by a vacuum operated pick-up disc, which conveys it to a rotary table where subsequent operations on the box blank are performed, as will be hereinafter described. As shown on Figures 17, 23 and 24, the pick-up device comprises a pair of pick-up discs 183, which are spaced 180° from each other, the arrangement being such that one pick-up disc 183 operates to pick up one of the box blanks and at the same time, the other disc discharges its blank. Thereafter the discs revolve and the above operation is repeated.

The construction and mounting of the two pick-up discs 183 are identical so that detail description of one is considered sufficient. As shown, each of the pick-up discs 183 is in the form of a circular disc having a depending annular flange 183'. The hub of the disc 183 is detachably secured to the lower end of a vertically disposed tube 184, the bore of the tube 184 aligning with a vertical opening through the hub of the disc 183. Secured to the opposite end of the vertical tube 184 is an upright C-shaped operating member 185, from one arm of which depends a plug 186 which is fixed to and closes the upper end of the tube 184. The tube 184 is slidable vertically within a bracket 187, the inner side of which is socketed to receive a horizontal tube 188. The opposite end of the tube 188 fits into and is fixed to a T-shaped fitting 189. Secured to the depending portion of the fitting 189 is a vertically disposed tubular shaft 190. In the upper portion of the vertical shaft 184 is a relatively large laterally disposed port 191 which when the shaft is in its lowermost position, communicates with a relatively small port 192 in the adjacent wall of the bracket 187.

It will be understood that a partial vacuum is imposed at all times within the vertical shaft 190 so that when the ports 191 and 192 are brought into communication, a suction is imparted through the vertical shaft 184 to the underside of the circular disc 183, this suction holding the box blank 10 to the outer edge flange 183'. As will hereinafter appear, the pick-up device rises vertically and then swings through an arc of 180° to dispose the blank in the position for its discharge to an operating table hereinafter to be described. When the disc 183 carrying the blank 10 reaches a position over the table, the C-shaped actuating member 185 engages a rigid arm 194 which projects outwardly above the operating table so that when the assembly moves downwardly, the upper portion of the C-shaped arm engages the fixed laterally extending arm 194, thereby retaining the C-shaped arm 185 and associated parts in the elevated position while the remainder of the assembly moves downwardly for a short distance. This is clearly shown on Figure 23 in which the pick-up disc 183 at the right of the figure has picked up the box blank 10 from the blanking mechanism and the pick-up disc 183 to the left of the figure has released its blank 10 so that it can move on to the additional mechanism, for folding the box blank as will hereinafter appear. When the assembly moves downwardly and the arm 185 engages the rigid arm 194 to hold the left-hand disc 183 in its elevated position, the relatively large port 191 in the vertical shaft 184 registers with a relatively large lateral atmospheric port 193 in the bracket 187. This enables air under atmospheric pressure to pass through the port 193, the port 191 and through the vertical shaft 184 to the disc 183 to free the blank 10 therefrom, it being apparent that the adjacent small port 192 is shut off by the wall of the shaft 184. The reason for employing the relatively small ports 192 is to maintain at all times subatmospheric pressure in the tubes 188 of sufficient magnitude so that when one or another of the larger ports 191, is brought into registry with a port 192, a suction is immediately available for holding a box blank 10 to the respective pick-up disc 183.

Friction means is provided for retaining the vertical shafts 184 against gravity sliding movement. As shown, wooden friction blocks are carried by the brackets 187 respectively to engage the sides of the shafts 184, these blocks being urged into frictional engagement with the shafts by coil springs 196 engaging opposite end portions thereof, as shown on Figure 24.

The vertical shaft 190 is freely mounted intermediate its ends in an upright guide 197 which is carried by a horizontal table-like part 198, the latter being secured to and supported by a lateral arm 199 embarcing a post or column 200 rising from the base 61. The lower end of the upright tubular shaft 190 is disposed within a housing 201 in which the shaft can turn and also can move vertically. Leading from the housing 201 is a tubular line 202 for creating a suction or subatmospheric pressure within the tubular shaft 190 and the pick-up assembly as above indicated.

Suitably mounted on a bracket adjacent the housing 201 is a pair of laterally spaced bell cranks 203, one end of which extends to a hub 204 which is integral with and depends from a driven friction disc 205. As shown on Figure 23, the friction disc 205 can move up and down with the tubular shaft 190 and also is operativley connected to rotate the shaft 190. Disposed immediately above the friction disc 205 is a driving friction disc 206, which has integral with it and disposed on its upper face, a small sheave 207 receiving an endless belt 208. The belt 208 is trained about a driving sheave 209 (Figure 1) which is considerably larger than the sheave 207. As will hereinafter appear, the sheave 209 is intermittently driven in timed relation to other portions of the mechanism, the arrangement being such that upon such intermittent movement, the tubular shaft 190 is rotated sufficiently to move the pick-up discs through an arc of 180°.

A pneumatic device 210 including a cylinder and piston is connected to operate the bell cranks 203, it being understood that upon operation of the pneumatic device 210, the bell cranks lift the tubular shaft 190 until the friction discs 205 and 206 are in engagement whereupon the shaft 190 is imparted a predetermined turning movement sufficient, as above mentioned, to move the pick-up discs 183 through an arc of 180°. Prior to the revolving movement of the discs 183, the lower portion of the left-hand actuating member 185 (Figure 17) abuts the underside of the arm 194, thereby shifting the associated valve or tube 184 to its lowermost position. After such revolving movement of the discs has been effected, the pneumatic device 210 is at once rendered ineffective and the weight of the parts returns or lowers the assembly to its downward position.

In order to insure that the pick-up assembly will lower to its desired position with the pick-up discs 183 properly positioned, a vertical arm or spike 211 depends from opposite sides of the T-shaped fitting 189 and the lower end of each spike has a tapered end 212. When the pick-up assembly is lowered, the tapered ends 212 extend into grooves formed in brackets 213 carried by the stationary guide 197. Manifestly as the pick-up assembly lowers, the tapered or pointed ends of the spikes 211 slide downwardly through the grooves in the brackets 213 and as a consequence, the two pick-up discs 183 are accurately positioned for picking up and discharging the box blanks 10.

The box blanks 10 are delivered by the pick-up device above described to a turntable 214 which is mounted for rotary movements upon the vertical post 200. As will hereinafter be described, the turntable 214 is imparted positive step by step movements and on the turntable are arranged a series of five jigs 215 to which the box blanks 10 are successively delivered. As the turntable 214 is indexed, the box blanks are progressively formed into boxes. Directly beneath the turntable 214 and fixed thereto for rotary movements is a semi Geneva wheel 216 which is cylindrical in form and is provided with a series of equidistantly spaced radially disposed slots 217 which are open at their outer ends at the periphery of the wheel 216. It should be mentioned that the relatively large sheave 209 over which the endless belt 208 is trained is connected to and is co-axial with the wheel 216, and the step by step motion imparted to the wheel 216 is accordingly imparted to the sheave 209.

The Geneva wheel 216 overlaps a portion of a driving disc 218 and on the underside of the disc 218 and fixed thereto for movements therewith is a gear 219. A pinion 220 meshes with the gear 219 and the pinion 220 is connected through suitable gearing, such as a worm and wheel (not shown) to an electric motor 221. Formed on the periphery of the disc 218 is an outwardly extending cam surface 222 of uniform curvature and carried by the upper side of the cam 222 near the forward end thereof is a roller 223 suitably mounted on a vertical axis. In this instance, the cam 222 extends for approximately one-fourth of the circumference of the operating disc 218 and as the latter rotates, the roller 223 enters one of the slots 217 of the Geneva wheel. As the disc 218 rotates, it imparts turning movement to the Geneva wheel 216 in an opposite direction, it being understood that the operating disc 218 rotates in a clockwise direction (Figure 28) and the Geneva wheel 216 is accordingly driven in a counterclockwise direction.

After the table has been indexed or advanced to a predetermined extent through the action of the roller 223 in one of the slots 217 of the Geneva wheel, the table 214 is positively locked against further movement until the roller 223 of the actuating cam disc 218 again enters the next succeeding slot 217 in the table. For this purpose, a triangularly shaped lever 224 is pivotally mounted at one apex at 225 on a supporting post 226 disposed adjacent and below the periphery of the wheel 216. The supporting post 226 is carried by supporting frame work which surrounds the post or column 200 on the base 61. Rising from another apex of the triangular lever 224 is a roller 227, which rides along the periphery of the actuating disc 218 and the cam portion 222. The roller or follower 227 is urged into engagement with the edge portion of the disc 218 by a tortional spring 230 (Figure 29). At the remaining apex of the lever 224 is an upstanding locking pin 228 which is adapted to enter the adjacent notch 229 in the periphery of the Geneva wheel 216 after the follower has passed from the cam portion 222 of the actuating disc 218 to the relieved edge portion of the disc. It will be apparent that after the disc roller 223 has completed its advancing movement of the wheel 216, then the locking pin 228 enters the groove 229, thereby positively locking the Geneva wheel 216 from further rotary movement. However, when the roller 223 enters the next succeeding slot 217, the locking pin 228 is rocked or cammed away from the notch, allowing the Geneva wheel 216 and accordingly the table 214 to resume its turning movement for the predetermined extent allowed, as will be readily apparent.

From the foregoing it will be understood that the box blanks 10 are successively delivered by the vacuum pick-up device to the turntable 214 on which are arranged in equi-distantly spaced relation five jigs 215 to which the box blanks are delivered. The mechanism is so timed that after the turntable has been indexed, a box blank is delivered to the adjacent jig 215 and upon the next advancing movement of the turntable, the next succeeding jig is freed of its box blank and is ready to receive one from the pick-up device. Since the jigs 215 are identical in construction and arrangement, description of one will suffice. The turntable is formed at its edge portions with notched apertures 214a, for the respective jigs and each jig comprises a pair of laterally spaced end plates 231, the outer end of each end plate being raised slightly from the surface of the table 214 by supporting strips 232 respectively. Extending laterally from the inner ends of the end plates 231 are strips 233 which rest in whole or in part on the table surface at the edge portions of the aperture 214a (Figure 27). At the inner edge of each of the end plates 231 is a downwardly curved edge portion 234 (Figures 26 and 27) which aids in the folding of the end walls of the box blank, as will hereinafter appear.

Each end plate 231 is laterally adjustable to accommodate different size box blanks, and as shown, the outer portion of each plate 231 is provided with an elongtae slot 235, the turntable therebeneath being formed with a longitudinally elongate slot 236. Resting on the top of each end plate 231 is a bridge spacer 237 through which extends a bolt forming a part of a bolt and nut assembly 238. It will be apparent that the arrangement of the slots 235 and 236 is such as to make possible substantial adjustment of the end plates toward and away from each other.

Extending across the table opening 214a and arranged in laterally spaced relation is a pair of slide folding plates 239 and each of these plates has reduced end portions or extensions 240 which, as shown in Figure 27, rest upon the table 214 at the edge of the opening, so that a portion of each plate 239 extends into the table opening a short distance below the upper side thereof. The inner or facing edge portion 241 of each side folding plate is curved inwardly and downwardly for assisting in the folding of the sides of the box blank as will hereinafter appear. To the outer edge of each of the side folding plates 239 is an upright facing strip 242, the upper portion of which projects upwardly beyond the upper surface of the side folding plate. Each facing strip 242 is secured to the edge of a side folding plate by screws 243 and as shown, the facing strips are provided with reduced end extensions 244, projecting from the upper portion of the strip and fitting over or resting upon the adjacent strip 233 of the respective end plate 231.

A pair of tab folding blocks 245 are supported on each of the end plates 231, the tab blocks of each pair being spaced laterally from each other and the outer end of each tab block having an extension which rests upon an adjacent facing strip 242. The inner sides of the folding blocks 245 or those sides of each pair of blocks facing each other, have stepped edge portions which support the end walls of the box blanks. As shown, each inside edge has a sloping wall 246 which inclines inwardly to a lower horizontal ledge 247. Each tab holding block 245 is adjustably connected to the respective end plate 231 by a transverse elongate slot through which extends a screw 248 thereby to enable the blocks to be adjusted laterally of the end plates to accommodate different size box blanks.

On Figure 25, the several stages through which the box blank passes are indicated. In the first stage, the blank is delivered to a jig 215 in such manner that the end walls 11 (Figure 4) rest upon the horizontal ledges 247 of the tab folding blocks 245 and the side walls 12 of the box blank are spaced upwardly from the side folding plates 239. After the turntable 214 is indexed so that such box blank is in the second stage position, tabs 14 are folded upwardly at right angles to the end walls 11 and the mechanism for effecting such tab folding operation is shown on Figures 32 to 34.

Pairs of curved heated blades 249 are employed for folding the tabs 14 at substantially right angles to the end walls 11 of the plastic box blank 10. As shown on Figure 33, the heated blades 249 of each pair curve outwardly in opposite directions, and as will hereinafter appear, the blades 249 (there being four in number) move downwardly together, simultaneously engaging all of the tabs 14 throughout their length in the region where they join the body of the blank. As the blades continue their movement downwardly, they heat the plastic sufficiently to enable folding of the tabs 14 as they slide over the vertical surfaces of the tab folding blocks 245 directly beneath the horizontal ledges 247. As shown, the ends of the curved blades 249 are somewhat rounded in order to effect the desired wiping contact between the blades and the tabs 14. Thus the box blank 10 is forced downwardly a slight extent and during such downward movement, each of the four tabs on the end walls 11 are folded at right angles to the end walls, as shown on Figure 5.

The curved heated blades 249 are carried by heater units 250, there being one heater unit for each blade and as shown on Figure 33, the electric heaters being arranged in pairs and the two pairs being suitably secured to the underside of a transversely disposed connecting bar 251. Suffice it to say that the electric heaters 250 are thermostatically controlled so that the desired degree of heat is delivered in each instance and at all times to the curved blades 249. For accommodating different size boxes, the blades 249 may be suitably mounted for adjustment.

Carried by the underside of the connecting bar 251 is a stripper device to insure that the box blank does not move upwardly with the folding blades 249 when the latter retract and after the tab folding operation has been completed. As shown, a plurality of spring wire stripper arms 252, preferably four in number, are secured at their inner ends to a plate 252a which is connected to a vertically disposed rod 253 having a piston reciprocable within a cylinder 254. The cylinder 254 is secured to the underside of the connecting bar 251 and between the connecting bar 251 and the piston is a coil spring 255. Near the lower end of the cylinder 254 is a fitting from which leads a tube 256. Air under pressure is normally delivered to the tube 256 to maintain the piston elevated so that the spring 255 is normally compressed. When the assembly commences its retracting movement, the air in the line 256 is momentarily shut off so that the coil spring 255 may force the spring stripper arms 252 downwardly to bear against the box blank 10 just long enough to insure that the blank will not adhere to the curved blades 249 when the latter retract.

Fixed to the upper side of the transverse connecting bar 251 adjacent opposite ends thereof are vertical rods 257 which are secured at their upper ends to a horizontally disposed cross head 258. The rods 257 are slidable through and guided by stationary sleeves 259 which are carried by brackets 260 fixed to opposite sides of a vertically disposed operating cylinder 261. As shown in Figure 35, the operating cylinder 261 is suitably secured to a supporting arm 262 which is fixed in any suitable manner to the upright post or column 200. Secured to the crosshead 258 and depending from the central portion thereof is a piston rod 263 which extends into the cylinder 261 and has a piston 264 at its lower end. Arranged at one side of the cylinder 261 and parallel thereto is a relay valve chamber 265 of substantially smaller diameter than the cylinder 261. The valve chamber 265 communicates with the cylinder 261 at its upper and lower ends by lateral ports 266 and 267 respectively. Reciprocable within the valve cylinder 265 is an elongate relay valve 268 which has upper and lower spool portions 269 and 270 respectively controlling the admission of air under pressure from the central portion of the valve cylinder to the upper and lower ends of the operating cylinder 261. Spaced slightly above the upper lateral port 266 is an exhaust port 271 and spaced slightly beneath the lower port 267 is an exhaust port 272. Air under pressure is admitted to the intermediate portion of the valve cylinder 265 from a port 273 from which leads a tube 274 communicating with a pressure tank so that air under pressure is at all times supplied to the relay valve cylinder 265.

On the upper end of the relay valve 268, spaced upwardly from the spool portion 269 and arranged above the exhaust port 271 is an elongate spool portion 275. Spaced above the spool portion 275 is an elongate piston-like end portion 276 which is reciprocable within a cylinder formed in a cap 277. The cap 277 is in screw-threaded engagement with the upper end of the relay valve cylinder and disposed within the cap 277 is a coil spring 278 which normally urges the relay valve downwardly to the position shown in Figure 35. In such position, air under pressure from the tank passes through the tube 274 and port 273, relay valve cylinder 265 and port 267, to the lower end of the cylinder 261, thereby normally to urge the piston 264 upwardly and retain it in its raised or elevated position.

Spaced from the lower spool portion 270 of the relay valve and disposed below the exhaust port 272 is a piston-like end portion 279. For admitting air under pressure, at the lower end of the relay valve cylinder is a tube 280 leading from the timing valve mechanism and joined to the tube 256 which controls the retraction of the stripper arms 252. When, as will hereinafter appear, air from the timing valve is introduced into the tube 280, it overcomes the pressure of the spring 278 and moves the relay valve upwardly, opening the lower end of the cylinder 261 to the exhaust port 272, and enabling air from the tank to enter the upper end of the cylinder 261 through the port 266, the spool portion 269 having been moved upwardly sufficient to uncover the port 266. From the above description, it will be manifest that the piston 264 is normally held in its raised position since the spring 278 holds the relay valve in such position that air enters the lower part of the operating cylinder 261.

Referring to Figure 32, a hydraulic check device is disposed on opposite sides of the actuating cylinder 261, for controlling the movement of the piston rod 263 and the associated parts. It is desirable for the parts to move upwardly or retract rapidly and to advance toward the work rapidly until a certain point in the travel is reached, whereupon the movement is progressively retarded. Retarding of the movement is desired about the time when the curved heated blades 249 engage the box blank 10 to perform the work thereon. As shown in Figure 32, a control cylinder 281 is arranged at opposite sides of the actuating cylinder 261 and these cylinders are suitably mounted on the brackets 260. The enlarged upper ends of the cylinders 281 are connected by a tube 282 and the lower ends of these cylinders are connected by a tube 283. Extending from the upper end of each cylinder 281 is a piston rod 284, the upper end of which is secured to the crosshead 258.

Since the two check devices are identical in construction, description of one is regarded as sufficient. As shown in Figure 32a, a piston 285 is connected to the lower end of each piston rod 284 and is reciprocable within the cylinder 281. Formed in the piston 285 is a spring-tensioned ball check valve 286 which moves to its seat when the piston moves downwardly within the cylinder but which is unseated upon the upward movement of the piston. At one side of the cylinder is a vertically elongate passage 287 which opens at its upper end into the enlarged upper end portion of the cylinder 281. The bottom end of the passage 287 communicates with the interior of the cylinder 281 by a lateral port 288. Spaced a short distance above the port 288 is a port 289 and directly opposite the port 289 is a port 290 connecting the interior of the cylinder 281 with a vertical passage 291 arranged parallel to the cylinder but extending a short distance from the port 290 to the bottom end of the cylinder. At the lower end of the cylinder 281 and aligned with the tube 283 is a port 292 communicating with the passage 291, the port 292 being controlled by a manually operated needle valve 293. Downward movement of the piston 285 is limited by a stop pin 294 which stops the movement of the piston at a point just above the connection of the tube 283 and the lateral port 292.

In the operation of the check cylinder, it will be understood that when the piston 285 moves downwardly, the liquid within the cylinder in advance of the piston is forced out through the ports 288 and 289 and passes upwardly through the passage 287 to the enlarged upper end of the cylinder as a reservoir. The two cylinders being connected at the top and bottom, also provide for flow of the liquid to and fro and thereby equalize the liquid volume and pressure. The downward movement of the piston 285 is relatively rapid until it passes the ports 289 and 290, whereupon the flow of liquid from below the piston is restricted and must pass through the port 288, thus retarding the movement of the piston. At the very end portion of the downward movement of the piston 285, the port 288 is covered, thereby even more retarding the piston movement and thereupon liquid must pass through the port 292 upwardly through the passage 291 and back above the piston 285 through the lateral port 290. This final movement of the piston 285 may be controlled by adjusting the position of the needle valve 293. It will be obvious that when the piston 285 moves upwardly and the ball check valve 286 is unseated, the movement may be relatively rapid, thereby enabling an abrupt return of the parts to their raised or inoperative position.

From the above description, it will be apparent that in the second stage (Figure 25), the two tabs on each of the end walls 11 of the plastic box blank are folded upwardly at substantially right angles. This movement is effected pneumatically, the heated curved blades 249 simultaneously contacting the end walls at the lines of bend and applying sufficient heat to the plastic material to enable the fold of the tabs to be readily effected. The mechanism moves down rapidly until it closely approaches the box blank, whereupon the hydraulic check means (Figure 32A) becomes effective in more and more retarding the movement during the time when the blades engage the blank and the folding action is effected due to the downward movement of the blank in the jig. 215. After the four tabs have been simultaneously folded and due to the operation of the timing valve mechanism hereinafter to be described, the air pressure to the relay valve is shut off, allowing the spring 278 to return the relay valve to its normal or lower position and enabling air from the line 274 to enter the operating cylinder 261 beneath the piston 264 and return it abruptly to its raised or inoperative position, the check pistons 285 being enabled to move upwardly rapidly as above described. When the air for the relay valve 265 is cut off from the tube 280, the air is also cut off from the stripper cylinder 254, so that the stripper arms 252 move down to strip the box blank at the same time the piston 264 starts upwardly. The stripper fingers 252 insure that the box blank will remain in the jig when the mechanism retracts. It will be understood that the above described operation takes place during a pause in the movement of the turntable 214. After that operation has been completed, the turntable 214 is indexed to move the jig carrying the box blank with upwardly folded end wall tabs 14, to the third stage as shown on Figure 25, where the end walls and side walls of the box blank are successively folded to positions at right angles to the bottom wall.

The mechanism for folding the end walls 11 and side walls 12 of the box blank which is operative in the third stage is shown particularly on Figures 36 to 39. The pneumatic operating mechanism including the hydraulic check or control device is generally indicated by the reference numeral 295 and since this mechanism is, in the main, identical to that employed in the second stage and illustrated on Figures 32, 33 and 34, the same reference numerals are employed in connection with the third stage except each is given the exponent "*a*." As shown, the bracket 296 for the operating cylinder 261a is secured to a supporting arm 297 which in turn is secured to and radiates from the tubular supporting column 200 of the machine. Embracing opposite sides of the horizontal connecting bar 251a are parallel heater supporting plates 298 which are fastened at their upper ends to the sides of the bar 251a and depend therefrom. The plates 298 support an electric heater 299 which is of any suitable construction preferably thermostatically controlled in order to provide a uniform heat of a predetermined degree sufficient to render the plastic of the box blank sufficiently pliable to make the desired folds, as will be readily understood. At the bottom end of the heater 299 is a flat horizontally disposed plate 300 of heat conductive material, the plate being rectangular in shape and having downwardly and outwardly inclined side walls 301, the free edges of which outline the bottom wall of the plastic box to be formed.

In operation, it will be understood that during the dwell or pause in the indexing movement of the turntable 214, the bar 215a and the heater parts depending therefrom move downwardly in response to the movement of the piston of the operating cylinder, first relatively rapidly and then more and more slowly after the heated inclined walls 301 have engaged the box blank and imparted downward movement thereto. During such downward movement of the plastic box blank, it will be understood that the end walls 11 first ride over the curved folding edge portions 234 of the jig whereby the end walls are simultaneously moved upwardly to a position substantially perpendicular to the bottom wall of the box blank and thereafter the side walls 12 of the box blank ride over the curved edge portions 241 of the jig to effect the folding of the side walls. In this manner, it will be apparent that the tabs 14 of the ends walls 11 are positioned on the inside of the side walls 12. Thus the box is completely formed except for securing the tabs 14 to the side walls, the latter operation being performed in the fifth stage as will be hereinafter described.

In the next indexing movement of the turntable, the folded box is delivered to the fourth or embossing stage where suitable embossing is provided on the bottom wall of the box by dies containing the selected design. As shown, spaced above the turntable is a stationary support 302 which has a pair of laterally spaced upright integral guide posts 303 through which a pair of rods 304 are respectively slidable. The upper ends of the rods 304 are connected to a transverse bar 305, the upper end portions of the rods 304 being shouldered to receive keeper members 306 which are formed with annular latch engaging flanges 307. Depending from an intermediate portion of the transverse bar 305 is a piston 308 which is slidably received within a cylinder 309. At the lower end of the cylinder 309 is an integral base 310 which is secured by screws 311 to the support 302. As shown in Figure 42, there is an integral bracket on the rearward portion of the cylinder 309 suitably secured to a lateral arm 309a which is rigidly connected to a stationary part of the machine, such as the upright column or post 200.

On the lower portion of the cylinder 309 and extending in opposite directions is a pair of enlargements 312 having laterally disposed aligned open ended cylinders. Slidable in these lateral cylinders are plungers 313 respectively, each plunger having a rounded button-like head projecting from the outer end of the respective cylinder. Air from the timing valve mechanism is admitted to the front of the cylinder 309 through a tube 315 and as shown on Figure 42, there are two parallel vertically disposed passages 315a and 315b which receive air from the tube 315 at their upper ends, the lower ends of these passages communicating with the lower end of the cylinder 309. The passage 315a is controlled by a spring-tensioned ball valve 315c which seats upwardly so as to enable air to pass downwardly into the cylinder 309 relatively freely but prevents the passage of air exhausting from the cylinder 309. A manually controlled needle valve 315d controls the flow of air through the passage 315b and is for the purpose of controlling the downward movement of the piston 308 and associated parts.

In the walls of the cylinder 309 are vertical passages 316 which lead from the lower end thereof to the cylinders for the plungers 313 respectively, the arrangement being such that when the piston 308 is in its lowermost position and air is admitted under pressure from the tube 315, a portion of it will pass up through the passages 316 and force the plungers 313 outwardly in opposite directions. At that time, the rounded heads 314 of the plungers bear against the lower ends of pivoted latch arms 317 which are pivoted intermediate their ends at 318 to the upright guide posts 303. The upper ends of the latch arms 317 have hook portions 317a which when the piston 308 is in its lowermost position, engage over the flanges 307 of the keeper members 306 to prevent the upward movement of the latter and associated parts. The latching arms 317 are yieldably urged to latching position by leaf springs 319 which are secured at one end to the sides of the cylinder enlargements 312. As soon as the air is shut off from the tube 315, the springs 319 return the latching arms to their normal position, and at the same time, push the plungers to their inwardly disposed position with the inner ends thereof adjacent the walls of the cylinder 309.

Directly beneath the stationary support 302 is a vertically movable block 320 through which the lower ends of the rods 304 extend, the bottom ends thereof being shouldered as indicated at 321 and rigidly secured in place as indicated. Formed in the central portion of the block 320 is a cylinder 322 which is open at its lower end and slidable within the cylinder 322 is a piston 323 which has a suitable cup leather packing at its upper end. Air is admitted from the timing valve mechanism to the upper end of the cylinder 322 through a tube 324.

At the underside of the block 320 is a horizontally disposed bar 325 which is secured to the outer end of the piston 323 by screws 326. The bar 325 has fixed thereto a pair of laterally spaced upright posts 327 which have shouldered lower portions to abut against the bottom of a socket 327a formed in the block 320 thereby to limit the relative movement between the bar 325 and block 320. The upper ends of the posts 327 are provided with heads to form an abutment for the upper ends of coil springs 328, the lower ends of which bear against the bottom of the socket 327a. Aligned with the sockets 327a are sockets 327b respectively, the latter being in the stationary support 302, the posts 327 being adapted to project therein.

Secured to the underface of the bar 325 is the upper embossing die Da but since the detail construction of the embossing die Da forms no part of the present invention, detail description thereof is not considered necessary. Suffice it to say that it is electrically heated and thermostatically controlled, this being necessary since the box is of plastic material which must be heated in order to achieve the desired embossing action.

Cooperating with the embossing mechanism above the turntable 214 is mechanism disposed beneath the turntable which includes a pad Db suitably mounted upon a horizontal plate 329. Depending from the plate 329 are vertically disposed laterally spaced rods 330, the rods being slidable through upper guides 331 and lower guides 332 respectively. These guides are carried by radially extending arms rigid with a supporting block 333 which in turn is rigidly carried by a laterally extending stationary supporting arm 334 (Figure 41) which is suitably secured to the lower portion of the machine frame. Depending from the central portion of the plate 329 is a piston 335 which is vertically slidable within a cylinder 336. On the lower end of the piston 335 is a reduced end portion 337 which is slidable within a socket in a cylinder closure plug 337a, thereby to form a pneumatic cushion stop for the downward movement of the piston 335.

Formed in the block 333 in the region of the lower guides 332, or just above them, is a pair of radially extending open ended cylinders 338 in which plungers 339 are slidable. Connected to the outer end of each plunger 339 is a cross plate 340 which projects beyond opposite sides of the respective plunger. The plungers 339 are urged toward their innermost positions within the cylinders 338 by coil springs 341 which connect the outer end portions of the cross plates 340 respectively as shown in Figure 41. Air under pressure from the timer valve mechanism is introduced to the lower portion of the cylinder 336 through a tube 342.

In the operation of the embossing stage or stage four, it will be understood that the turntable will have been indexed to position a jig 215 carrying one of the folded boxes in the proper position with respect to the embossing die Da which is of such size and shape as to fit inside of the box for forming the impression or design on the bottom wall thereof. With air pressure cut off, the embossing mechanism disposed above the table is in its lower position (Figure 40 indicating the upper or raised position of the parts), because the weight of the parts causes the assembly to slide downwardly, the block 320 separating from the stationary support 302 and the keeper members 306 resting against the upper ends of the guide posts 303. In this position, the hooked ends 317a of the latch arms 317 engage the keeper flanges 307 and militate against the upward movement of the assembly. As soon as air is admitted under pressure through the tube 315, the plungers 313 are forced outwardly thereby actuating the latch arms 317 to release the keeper flanges 307 and allow the piston 308 to be moved upwardly carrying with it the block 320 and associated parts, such movement continuing until the block 320 abuts against the stationary support 302.

Assuming that the folded box is in position preparatory to the embossing operation, the air is shut off from the tube 315 allowing the block 320 and associated parts to move downwardly, such downward movement being controlled by the manual valve 315b (Figure 42) which regulates the exhaust of air from the cylinder 309 to the tube 315. Then when the die Da has substantially reached the bottom wall of the box, the timer valve operates to introduce air under pressure to the tube 324 to effect the pressure stroke for forcing the embossing die Da into firm engagement with the material of the bottom wall of the folded box. Simultaneously with the movement of the die Da, the pad Db from the underside of the turntable will have moved upwardly under the influence of air introduced through the tube 342, the pad engaging the underside of the bottom wall of the box for receiving the pressure exerted by the embossing die Da. It will be understood that when the piston 335 uncovers the lateral cylinders 338, the air forces the plungers 339 laterally and holds them in that position so that the cross plates 340 are disposed beneath the bottom ends of the rods 330. In this manner the downward thrust on the pad Db is transmitted to the cross plates 340 which in turn may be backed up by the upper ends of the guides 332. As soon as the air is shut off from the tube 342, the coil springs 341 move the plungers 339 inwardly thereby shifting the cross plates 340 away from the lower ends of the rods 330 and allowing the pad Db and associated parts to move downwardly, the end of such movement being air cushioned by the piston extension 307 entering the socket in the closure plug 337a. It will be understood that after the embossing action has been completed, air from the timer valve mechanism is introduced to the tube 315 to move the parts abruptly upwardly, the air being shut off previously from the tube 324 so that the springs 328 can move the embossing Da and associated parts upwardly toward the block 320. Thus the movement of the parts away from the embossed box is very rapid to enable further indexing of the turntable.

After the folded box has been embossed at the fourth stage as above described, the turntable 214 is again indexed, delivering the box to the fifth stage. In this stage, the welding operation occurs, that is, the tabs 14 at the four corners of the box are welded to complete the box structure. When the box reaches the fifth stage, the bottom of the box is first engaged by a vertically movable pad 360 which moves upwardly from beneath the turntable 214 and raises the box to the desired welding position. In this instance, the pad 360 is rectangular in shape (Figure 44) and is formed with an upstanding rim 361 and a raised central portion 362 which is flush with the rim 361, an intermediate channel or grooved portion 363 being disposed between the rim 361 and the raised portion 362. There is a hole 364 disposed centrally of the pad and extends through the raised portion 362. Extending through the raised portion 362 and providing a communication between the channel 363 and the opening 364 are grooves 365. As will hereinafter appear, suction is created in the channel 363 to retain the folded box in position on the pad during its upward movement. Extending into the hole 364 of the pad 360 is an elongate relatively small diameter tube 366 which depends therefrom into a cylinder 367, the upper end of which is closed by a cap 368 through which the tube 366 is slidable. Suitably secured to the cylinder 367 and extending laterally therefrom is a supporting arm 369 which is secured to any suitable manner to a rigid portion of the machine beneath the turntable 214.

The lower end of the tube 366 is fixed to the upper end of an elongate piston-like cylindrical rod 370 which is reciprocable vertically within a reduced cylinder extension 371. Secured to the upper end of the piston-like rod 370 is a piston 372 which is movable within the cylinder 367. In the upper end portion of the piston-like rod 370 is a longitudinal passage 373 which communicates with the bore of the tube 366 and at the lower end of this passage is a relatively wide lateral port 374 which opens to the outside of the rod 370.

Providing a closure for the lower end of the reduced cylinder extension 371 is a transversely disposed valve housing 375 through which extends a cylindrical passage 376. Slidable within the passage 376 is a spool valve having a pair of spool portions connected by a stem.

Leading form the valve passage 376 is a port 378 to the reduced cylinder extension 371 and spaced to the right of the port 378 and on the opposite side of the valve passage 376 is an exhaust port 379 (Figure 43b). As shown in that figure, at the right of the exhaust port 379 is a tube 380 for admitting air under pressure from the timer valve mechanism for actuating the spool valve 377 to the left of the figure. Communicating with the passage 376 and disposed to the left of the port 378 is a tube 381 which leads from a pressure tank for delivering air under pressure to the reduced extension 371 for actuating the piston-like rod 370. Engaging the left-hand end of the spool valve 377 is a coil spring 382 for normally holding the valve 377 to the right of the figure and in such position as to open the reduced cylinder extension 371 to exhaust through the ports 378 and 379 as will be readily apparent. In operation, it will be understood that air under pressure from the timer valve passes to the valve housing through the tube 380 and shifts the valve 377 to the left of the figure, compressing the coil spring 376 and uncovering the passage from the tube 381 to the reduced cylinder extension 371 through the port 378 thereby forcing the piston-like rod 370 upwardly.

As the piston-like rod 370 moves upwardly, a partial vacuum is created between the underside of the piston 372 and the upper end of the cylinder extension 371 and when the port 374 is uncovered by its movement past the upper end of the cylinder 371, subatmospheric pressure or suction is created in the passage 373 and consequently in the elongate tube 366. Since the upper end of the tube 366 communicates by grooves 365 with the channel 363 in the box-engaging pad 360, it will be readily understood that the box blank will be retained by suction in engagement with the pad 360 during the latter's upward movement to the welding mechanism. Such suction is created in the tube 366 and consequently the pad 360 just at the time the latter has moved into engagement with the folded box blank.

Means is provided for militating against the piston 372 creating such a vacuum on its underside during its upward movement as to interfere with free upward movement of the parts. It is important to maintain sufficient suction on the box carried by the pad 360 to retain it in the desired position, but unless some means is provided to relieve to a certain extent the vacuum created by the upward movement of the piston 372, it will be apparent that there would be very slow upward movement of the parts or there would be no movement. To overcome this difficulty, a lateral port 384 communicates with a vertical passage 385 disposed on the inner side of the cylinder 367 and the passage 385 is controlled by a spring pressed ball check valve 386 which, as shown on Figure 43A, seats upwardly. The vertical passage 385 communicates with the interior of the cylinder 367 by lateral ports 387 and 388, the former being disposed a substantial distance upwardly from the port 384 and the latter being at the upper end of the passage 385. It will be seen that when the piston 372 uncovers the port 384 and the subatmospheric pressure in the cylinder 367 beneath the piston 372 is sufficiently great, the valve 386 is unseated and the partial vacuum is reduced by taking in or drawing air from above the piston 372. This enables the piston 372 to move upwardly within its cylinder and still maintain the desired suction for holding the folded box to the pad 360. It will be observed that the air which is taken for reducing the partial vacuum beneath the piston 372 is from within the cylinder 367 and not from the outside. The two ports 387 and 388 enable a greater volume of air to pass to the underside of the piston 372 during the movement of the latter up to the port 387, but when the latter is covered by the piston, the passage of air to the underside is restricted, thereby retarding the piston movement. The final movement of the piston 372 after it has passed the port 388 will be cushioned by the air compressed between the upper end of the piston 372 and the end closure 368.

As the pad 360 moves upwardly, a pair of helical coil springs 383 are placed under tension, the upper ends of these springs being secured to the underside of the hub of the pad 360 and the lower ends being attached to the valve housing 375. Thus after the pad 360 has completed its upward movement, the springs 383 will have been placed under tension so that when the air from the timer valve through the tube 380 is shut off allowing the valve 377 to move to the right, thus connecting the port 378 with the exhaust port 379, the springs 383 will return the parts abruptly to the lower position, disposing the pad 360 in position beneath the turntable 214 for engaging and lifting the next succeeding folded box after the next indexing movement of the turntable has been completed.

It is desired that this downward movement of the pad 360 and associated parts be abrupt until the piston 372 approaches the lower portion of its movement, when its motion is gradually retarded. For this purpose and as shown in Figure 43a, a vertical passage 389 is disposed at the outer side of the cylinder 367 and in the upper end portion of this passage is a downwardly seating ball check valve 390 which seats by gravity. The passage 389 communicates with the interior of the cylinder 367 above the ball valve 390 through a lateral port 391. The lower end of the passage 389 communicates with the cylinder 367 by three lateral ports 392, 393 and 394, which are progressively smaller in diameter, the port 392, the uppermost port, being the largest. It will be further noted that the uppermost lateral port 391 is larger than any of the ports 392, 393 or 394. When the piston 372 moves upwardly, the ball valve 390 remains in its seat, since the pressure holding the valve 390 to its seat is greater than that which would tend to unseat it. However, when the piston 372 moves downwardly, the upward pressure created in the vertical passage 389 is sufficient to unseat the valve allowing air from below the piston to pass upwardly through the lateral ports 392, 393 and 394, past the valve 390 to the upper portion of the cylinder 367 through the lateral port 391. When the port 392 is covered by the piston 372, the downward movement of the latter is checked since the area of the ports 393 and 394 restricts the passage of air from the cylinder 367. This downward movement of the piston 372 is further checked as the ports 393 and 394 are progressively covered so that when the piston 372 passes the lowermost lateral port 394, it moves relatively slowly and the air beneath the piston acts as a cushion to bring it to a stop.

Figure 50:
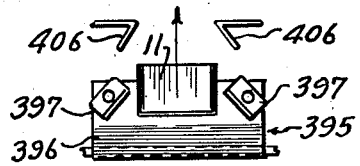
Figure 50 is an elevation showing on the pans in raised position and illustrating the oppositely inclined cam plates and the stationary guide arranged above the pan.

When the pad 360 delivers a folded box to the welding mechanism, it is important that the side and end walls be properly positioned relative to each other and mechanism is provided to insure that this will be accomplished. For this purpose, an arm 395 is arranged on each side of the path of travel of the folded box as the latter is moved above the turntable 214. Each arm 395 has a bent outer end portion or pan 396 so that in the downward position of the arms, the pans are in a horizontal plane, as shown on Figure 43. On the underside of each pan 396 is a pair of cam plates 397 which, as shown on Figure 50, incline in opposite directions and depend below the arm in the normal horizontal position thereof. Each arm 395 is mounted on a pivot pin 398 which is fixed for movement with the arm, the pivot pins being rotatable in stationary brackets 399. Encircling each pivot pin 398 is a torsional spring 400 which urges the respective arm to its normal or downward position shown on Figure 43. On the end of each pivot pin 398 is a fixed arm 401 to which a vertically disposed piston rod 402 is pivoted, the latter having a piston 403 which reciprocates in a fixed cylinder to which air under pressure from the timing valve mechanism is delivered through a tube 404.

As the pad 360 raises a folded box, air under pressure is simultaneously delivered to the tubes 404 for swinging the arms 395 upwardly so that as the box travels upwardly, the cam plates 397 engage the side walls 12 adjacent each end of the box and insure that they are properly positioned, whereas the portions of the pans 396 between the cam plates 397 engage the opposite end walls 11 of the box to make sure that they are properly positioned relative to the side walls.

The brackets 399 depend from horizontally disposed L-shaped supporting bars 405 (Figure 47) which are suitably secured in a stationary manner to the supporting post or column 200. To further insure that the side and end walls of the box are properly positioned relative to each other when the box is delivered to the welding mechanism, a pair of oppositely inclined guide plates 406 depend from the supporting bars 418 respectively and are arranged directly above the position assumed by the pans 396 when the latter are in their raised positions (Figure 46).

Welding electrodes are directly above the inclined guide plates 406 and consist of sets of movable electrodes 407 and stationary electrodes 408, a pair of these electrodes being arranged for each corner of the box for the purpose of welding or homogeneously uniting the tabs 14 of the end walls 11 to the adjacent portions of the side walls 12. Normally, these sets of electrodes are spaced apart so that the vertically movable pad 360 will move the folded box so that the stationary electrodes 408 are arranged inside of the box and the movable electrodes 407 are disposed on the outside of the box.

Each movable electrode 407 is embraced on three sides by an insulating block 409 which is U-shaped in cross section. Each insulating block 409 is carried by a bell crank arm 410 which is mounted on a stationary pivot 411. On the outer side of each insulating block 409 is a separate insulating plate 412 which is doweled to but free from the block 409 and is held in place by a leaf spring 413 which has one end fixed to the arm 410. The outer end of each insulating plate 412 is L-shaped and resiliently engages the outer face of the adjacent end wall 11 of the box near the folded tab, and as will hereinafter appear, urges the end wall against the stationary electrode 408, before it is welded.

Pneumatic means is provided to actuate the individual movable electrodes 407 into engagement with the side walls of the box in the region where the latter engages the folded tab 14. For this purpose, a piston 414 is adapted to engage the arm 410 and is reciprocable within a cylinder 415 which is stationary and is carried by a supporting plate 418. A coil spring 416 is interposed between the stationary part and each arm 410 for urging the latter to inoperative position (see Figure 49). Air from the timer valve mechanism is introduced to each of the cylinders 415 through individual tubes 417. The supporting plates 418 extend beneath the horizontal supporting bars 405 and are adjustably secured in place. As shown, elongate slots 419 in the bars 405 are provided for the plate 418 respectively and knurled headed screws 420 adjustably secure the respective plate 418 in the desired position. This enables the individual supporting plates 418 to be adjusted to accommodate different sized boxes.

Associated with each of the four movable electrodes 407 and arranged to engage the inside of the box are four stationary electrodes 408, each of which is adapted directly to abut against the inside of a tab 14. From Figure 47, it will be apparent that the movable electrodes 407 swing through an arc into welding position, the projecting portion of the respective insulating plate 412 pressing against the end wall adjacent thereto to urge it into engagement with the adjacent stationary electrode. The four stationary electrodes 408 are suitably carried by a substantially H-shaped yoke 421 (Fig. 47) which is rigidly carried by a supporting arm 422 extending inwardly for attachment to a stationary part of the machine, such as the supporting post or column 200.

The electronic equipment and associated parts for effecting the welding of the tabs 14 to the end walls 12 will be hereinafter described. Suffice it to say that one end of the box is welded and thereafter, the other end is welded. Thus the welding takes place in sequence, one end first being welded and thereafter the opposite end.

After the box has been welded, it is pushed downwardly or ejected from the welding electrodes until it comes to rest on the pans 396 of the pivotally mounted arms 395. Such ejection is accomplished by a pad 423 which may be of wood, and is somewhat smaller than the bottom wall of the box, as shown on Figure 45. The ejector pad 423 is carried by a pair of vertically disposed parallel rods 424 which are slidable through apertures in the electrode supporting yoke 421 and also through a guide block 425 which is rigid with a vertically disposed cylinder 426. The cylinder 426 is supported at its lower end by the enlarged end portion of the supporting arm 422 to which it is secured in any suitable manner. Projecting into the upper end of the cylinder 426 is a piston rod 427 having a piston at its lower end (not shown) vertically slidable within the cylinder. The upper end of the piston rod 427 as well as the upper ends of the parallel rods 424 are secured to a cross bar 428. Air under pressure from the timer valve mechanism later to be described, is introduced to the lower end of the cylinder 426 through a tube 429, the air pressure normally holding the parts in raised or inoperative position in which the ejector pad 423 is in the raised position shown in Figure 46. The air pressure is on at all times to hold the ejector pad 423 in the raised position. However, when such air pressure is shut off, then coil springs 430 arranged at opposite sides of the cylinder 426 (only one being shown), abruptly cause the ejector pad 423 to push the welded box downwardly to rest upon the pans 396 of the pivoted arms 395. As shown, the coil springs 430 are connected at their upper ends to the cross bar 428 and at their lower ends to a lower portion of the stationary cylinder 426.

In the operation of the welding mechanism above described, it will be understood that the lifting pad 360 rises to engage a folded box which is held by suction to the pad 360. The pad 360 then delivers the box to the welding electrodes where it occupies the position shown in Figure 47. Just prior to the time that the box reaches the welding electrodes, the two arms 395 are swung upwardly to the position shown in Figure 46 which insures that the end walls and side walls of the box are properly in position to enter the spaces between the welding electrodes, the box being further guided by the oppositely inclined guide plates 406. As soon as the lifting pad 360 has delivered the box to the welding electrodes, the electrodes clamp and hold the box, and the pad 360 promptly retracts. Thereafter, the pans 396 swing downwardly to box-receiving position.

As soon as the welding operation has been performed, the ejector pad 423 is operated in order abruptly to push the box downwardly until it comes to rest upon the pans 396. As soon as the ejector pad 423 has delivered the finished box to the pans 396, it retracts and at that time, a kick-out mechanism operates to push or kick the finished box from the machine.

Figure 51:
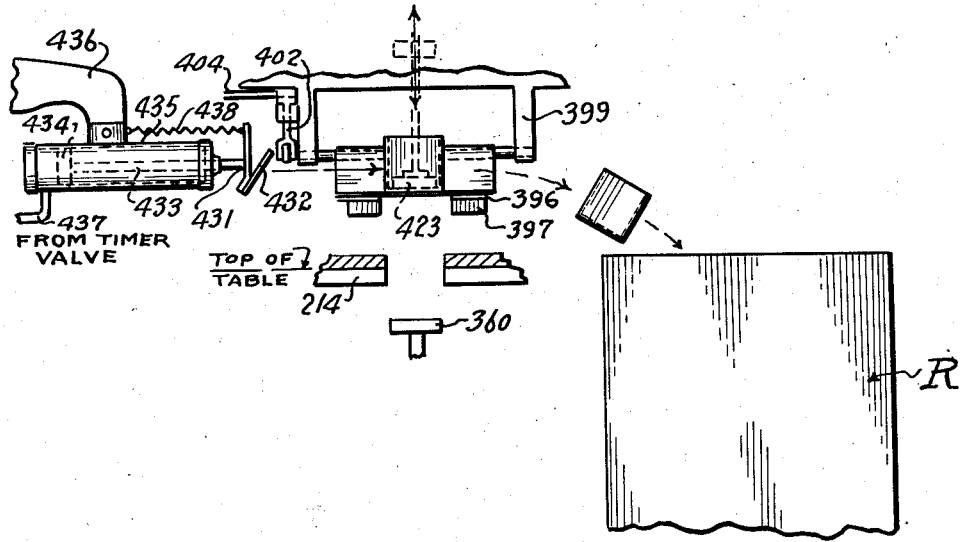
Figure 51 is a fragmentary side elevational view showing the kick-out mechanism for ejecting the completed box from the machine.

Referring to Figure 51, a vertically disposed pusher plate 431 is arranged inwardly of the pans 396 and has a spring plate 432 which is connected to a lower rearwardly bent portion of the pusher plate 431 so that the plate 432 normally inclines forwardly and upwardly, in position to engage a side wall of the welded box. The pusher plate 431 is carried at the front end of a horizontally movable piston rod 433 which has a piston 434 at its inner end mounted for reciprocatory movement within a cylinder 435. The cylinder 435 is carried by a supporting arm 436 which is fixed to a stationary part of the machine such, for example, as the tubular column or support 200. Air from the timer valve mechanism is admitted through a tube 437 to the inner end of the cylinder 435 for forcing the piston 434 outwardly, a coil spring 438 being connected at one end to the upper end of the pusher plate 431 and at the opposite end to the supporting arm 436 for forcing the parts inwardly.

It will be understood that as soon as the ejector pad 423 has retracted, air is admitted through the tube 437 to force the piston 434 outwardly or the right of Figure 51, thereby to enable the inclined spring 432 to engage the adjacent side wall of the finished box and force the same abruptly from the pans 396 into a drum or suitable receptacle R. As soon as the finished box has been kicked off, the air is released from the tube 437 enabling the spring 438 abruptly to retract the piston and associated parts.

Referring to Figure 47, a post 439 is adjustably slidable through the supporting arm 422 and its vertical position can be fixed by a set screw 440. Carried by the post 439 for up and down movement with it, is a switch 441 which has a laterally extending switch actuating arm 442. As indicated on Figure 52, when a box has been delivered to welding position by the pad 360, it engages the switch arm 442 and rocks it sufficiently to close the switch. In this connection it will be noted that the switch arm 442 is pivotally mounted at 443 and carries a cam 444 which bears against a contact carrying spring arm 445. Thus when the box is moved to welding position and trips the switch arm 442, the latter moves the contact carried by the arm 445 into engagement with a stationary contact 446. Extending from the stationary contact 446 is a lead 447 which passes through a side wall of a housing 448a and connects to a conducting plate 448. The conducting plate 448 is attached to the upper side of a horizontally disposed reciprocatory insulating plate 449 arranged within the housing 448a. As shown on Figure 52, at the right hand end of the plate 449 is a socket 450 which slidably receives a cylindrical pin 451 rigidly carried by the housing 448a. Interposed between the end of the pin 451 and the bottom of the socket 450 is a coil spring 452. At the left hand end of the plate 449 is a socket 453 into which projects a rigid tube 454 rigidly carried by a wall of the housing 448a. The arrangement is such that air under pressure delivered to the tube 454 is sufficient to shift the plate 449 to the right of the figure, compressing the spring 452. When the air pressure is released, then the spring 452 returns the plate 449 to its left hand position.

Depending from the conducting plate 448 is a pair of spaced parallel pins 455 which extend through the plate 449 and carry at their lower ends contact knobs 455a and 455b respectively. Carried by the bottom wall of the housing 448a is a rigid upstanding contact plate 456 which is disposed between the contact knobs 455a and 455b and when the reciprocatory plate 449 is in its right hand position, the knob 455a engages the plate 456 and when in the left hand position, the knob 455b engages the contact plate 456. Extending from the rigid contact plate 456 is a lead 457 which connects to a relay 458, which in turn is connected to a source of electrical current 459. Extending from the relay 458 is a lead 460 to an electronic machine 461, the details of construction and operation of which form no part of the present invention so that description thereof is not considered necessary. Suffice it to say that the electronic machine creates high frequency electrical impulses for effecting the desired welding through the stationary and movable electrodes heretofore described.

Returning now to the switch 441 which has the box operated arm 442, a lead 462 extends from the movable contact 445 to a stationary contact carrying spring arm 463 with which the contacts of a movable contact carrying arm 464 is engaged. A lead 465 extends from the contact of the movable contact arm 464 to a contact carried by a stationary contact carrying arm 466. Normally the contact of the arm 466 is spaced from the contact carried by a movable contact carrying arm 467. From the latter extends a lead to ground 468.

The movable contact carrying arm 467 has a pivoted arm 469, the arm 469 being connected at its opposite end to a piston 470 which is reciprocable within a cylinder 471. Connected to an intermediate portion of the movable contact carrying arm 464 is an arm 472 which is connected at its opposite end to a piston 473 reciprocably mounted within a cylinder 474. Disposed at right angles to cylinders 471 and 474 is a plunger cylinder 475 in which a plunger 476 is reciprocable. Midway between the cylinders 471 and 474 and leading from the cylinder 475 is a passage 477 with which a tube 478 communicates, the latter being connected at its opposite end to the rigid tube 454 within the housing 448a.

After the timing valve mechanism as will hereinafter appear, has operated, air under pressure is introduced through a tube 479 to the outer end of the cylinder 475, thereby forcing the plunger 476 downwardly (Figure 52) and first uncovering the port to the cylinder 471, and thus admitting air to drive the piston 470 to the left of the figure for bringing the contacts carried by the arms 467 and 466 into engagement. In so doing, the circuit is completed from the ground 468 through the leads 465 and 462, the switch 441, the lead 447, the conducting plate 448, one of the depending rods 455, and the contact knob 455b, the stationary contactor 456 and thence through the lead 457 to the relay 458 and source of electrical current 459. The relay then energizes through the lead 460 and sets in operation the oscillator circuit of the electronic machine 461.

It will be understood that the plate or bar 449 is normally in its left hand position due to the action of a spring 452, so that the contact knob 455b is in engagement with the contactor 456. Manifestly movement of the bar 449 to the right of the figure in response to air under pressure from the tube 454 will bring the contact knob 455a into engagement with the contactor 456. The circuit will be broken during the movement of the bar 449 when the contactor 456 is freed of engagement with one of the knobs 455a and 455b.

As the plunger 476 continues its downward movement, it uncovers the passage 477 and allows air to pass through the tube 478 to the rigid tube 454 for shifting the bar 449 to the right of the figure and the bar 449 will be held in this right-hand position until the passage 477 is covered upon the return or upward movement of the plunger 476. The further movement of the plunger 476 uncovers the port leading to the cylinder 474, whereupon the piston 473 is forced to the left and moving the contact carrying arm 464 away from the arm 463 and thereby breaking the circuit. Afterwards, the air from the timing valve mechanism is shut off allowing the plunger 476 to return or move upwardly. The shutting off of the air and simultaneous opening of the tube 479 to exhaust, as will hereinafter appear, enables the bar 449 to shift to the left of the figure in response to the spring pressure and the contact carrying arm 467 moves away from the arm 466 so that the circuit is broken, it being understood that as soon as the air pressure is shut off, the contact arm 464 moves to bring its contact into engagement with that carried by the arm 463.

When the plunger 476 moves downwardly (Figure 52), its movement should be relatively slow and predetermined so that the same amount of time is taken to effect the welding at one end of the box as is taken to effect the welding at the opposite end of the box, and also to afford the time necessary to perform satisfactory welding operations. On the other hand, after the welding of the box has been accomplished, it is desirable for the plunger 476 to return abruptly to its upper position. As shown, a collar 480 is on the lower end of the plunger 476 and limits the upward movement thereof. Rigid with the collar is a depending reduced extension 481 which is connected at its lower end to a piston 482 which reciprocates within a liquid-containing cylinder 483. A helical coil spring 484 is disposed between the bottom end of the cylinder 483 and the piston 482 and functions to return the piston and the plunger 476 to its raised position. A post 485 in the lower end of the cylinder limits the downward movement of the piston. Formed in the piston is a longitudinal passage 486 and disposed therein is a ball valve 487 which seats when the piston moves downwardly, but is unseated when the piston 482 moves upwardly within its cylinder. Formed in the lower end of the plunger extension 481 is a T-shaped passage 488 which communicates with the piston passage 486 to permit flow of liquid upon the upward movement of the piston. At one side of the cylinder 483 and parallel thereto is a longitudinal passage 489 which communicates at one end with an enlarged chamber 490 above the cylinder 483 and at the other end with the lower end portion of the cylinder 483 through a lateral port. The lateral port is controlled by a manual needle valve 491 thereby to regulate the downward movement of the piston 482 in its cylinder.

It will be understood that when the plunger 476 moves downwardly, the ball valve 487 is seated and the liquid within the cylinder 483 is forced past the valve 491 and up through the passage 489 to the chamber 490 and this movement can be relatively slow or fast as determined by the adjustment of the needle valve 491. When the air pressure in the tube 479 is shut off, then the spring 484 can abruptly move the plunger 476 and associated parts upwardly, the ball valve 487 being unseated and liquid being adapted to pass freely from the upper side of the piston to the lower side thereof as will be readily apparent.

Depending from the electronic machine 461 is a current carrying post 492 which is slidingly engaged by a spring contact arm 493, the opposite end of which is secured to the bar 449 by a pin 494 of electrical conductive material to the lower end of which is secured a contact plate 495 disposed on the underside of the bar 449. Suitably mounted beneath the bar 449 and in the path of movement of the contact plate 495 are contact rollers 496 and 497 which are spaced laterally from each other. The contact roller 496 is electrically connected by a lead 498 to a pair of stationary electrodes 408 arranged at one end of the box for welding the corner portions thereof. The movable electrodes 407 are connected to ground by leads 499 and 499a respectively. Thus when the bar 449 is in its left-hand position (Figure 52), the high frequency current from the electronic machine passes through the post 492, the contact arm 493, pin 494, contact plate 495, roller 496 and through the lead 498 to the stationary electrodes 408. When the bar 499 is in its right-hand position to bring the contact plate 495 into engagement with the roller 497, current passes from the roller 497 through a lead 500 to the stationary electrodes 408 at the opposite end of the box. Between the stationary and movable electrodes, high frequency oscillations are set up due to the action of the electronic machine. Thus it will be apparent that first one end of the box is welded so that the tabs on that end are simultaneously welded to the adjacent side walls and after that operation has been performed, then the tabs on the other end of the box are welded to the adjacent side walls. The same period of time is devoted to the welding of the tabs on one end of the box as upon the opposite end of the box, and consequently a uniformly welded box structure is obtained.

Heavy brass or copper rod loops 502 (Figures 46 and 48) serve as turners for oscillation control, the slider 503 serving as an adjustment for correcting the tuning. The design gives flexibility to the tuner 502 to permit the necessary movement of the electrodes 407.

Referring to Figures 53 and 54, the timer valve mechanism is for controlling the delivery of air under pressure to the various parts of the machine as hereinbefore described. In order to synchronize the operation of the various parts of the machine, the compressed air must be delivered to the right place at the right time. As will hereinafter appear, the valves which control the admission of compressed air are cam-actuated, the various cams being positively driven and coordinated to the movement of the turntable. As shown, a shaft 504 depends from and is driven by the gear 219 which controls the movement of the turntable (Figure 30). On the lower end of the shaft 504 is a helical gear 505 which meshes with a helical gear 506 on a transversely arranged cam shaft 507 supported within a housing 508. On the shaft 507 is a series of cams 509, one being provided for each device or mechanism in the machine actuated by compressed air. In this connection, see the legends on Figure 53 schematically indicating the various devices to which compressed air is delivered. Inasmuch as some of the devices, such as the blanking mechanism, include several parts which are simultaneously operated, the block "blanking" should be understood to include several tubes or lines leading to the several devices which are simultaneously operated. Manifestly, the position and angularity of the several cams 509 are predetermined and selected to effect compressed air delivery at the proper time.

Each of the cams 509 is engageable with a roller 510 which is carried by an arm 511 pivoted at one end at 512 to the housing 508. At the opposite end of each arm 511 is a reduced extension 513 which may be actuated by a manual lever 514 having a relatively short extension 515 to engage the underside of the extension 513 for manually operating the associated valve, as will hereinafter appear. This enables one or another of the valves to be manually operated for test or other purposes without operating the entire machine. The arm extension 513 engages the lower end of a valve stem 516 which is vertically slidable within a valve housing 517 suitably mounted upon and carried by the housing 508. At the upper portion of the stem 516 is a poppet type valve 518 which is urged to its seat by a coil spring 519, the valve seating downwardly against its seat 520. The valve 518 controls the admission of compressed air from a tube 521 to a longitudinal passage 522 below the valve seat 520. Compressed air is delivered to the tube 521 from any suitable source such as from a pressure tank to which air is delivered by a suitable compressor (not shown). Leading laterally from the longitudinal passage 522 is a tube 523 which extends to one of the devices or parts of the machine to be operated. Slightly below the tube 523 and to the opposite sides of the valve housing 517 is a port 524 which provides the exhaust. The exhaust port 524 is controlled by a spool 525 on the valve stem 516, the arrangement being such that when the poppet type valve 518 is closed, preventing the admission of compressed air from the tube 521, the spool 525 uncovers the exhaust port 524 and allows the air from the tube 523 to be open to exhaust.

For convenience in assembly and economy of space, it will be noted that the vertical valve housings 517 are in staggered relation and consequently the pivoted valve operating arms 511 are alternately arranged. The supporting post or column 200 is of tubular form and provides the pressure tank or air receiver and due to its unique location, the lines lead conveniently to the several mechanisms.

Summarizing the operation of the machine above described, it will be understood that the sheet of plastic material which is a continuous one and in roll form, is first decurled so that as delivered to the blanking mechanism, it is entirely flat. The feed of the continuous sheet to the blanking mechanism is step by step and between each advancing movement, a section of the sheet of a size proper for the box to be formed, is severed. However, the air engine of the decurler operates continuously but in such manner as to cause an almost steady flow of the sheet to the step by step mechanism. Adjustment of the decurler engine can be made to adjust the average speed of the continuous sheet to approximate the amount of sheet required which varies according to the size of the box to be formed, the larger the box the more material being required.

Then the severed section is delivered to the blanking mechanism which operates to form a blank from which the side and end walls may be properly folded with relation to the bottom of the box. Thereafter, the individual blanks are lifted from the blanking mechanism and successively conveyed to a turntable on which are arranged a series of jigs. One box blank is delivered to a jig and then the turntable indexes or advances a short distance to the second stage, the first stage being that where the blank is originally received upon the turntable. In the second stage, the tabs 14 are folded relative to the end walls. The turntable then advances to the next or third stage, where the end walls and side walls are successively folded to positions at substantially right angles to the bottom of the box.

Thus the box is completely formed except for securing the tabs 14 to the adjacent walls. At the fourth stage, the bottom wall of the box is suitably embossed with a selected design. Finally and at the fifth stage, the welding operations are performed for securing the tabs 14 to the side walls of the box. The welding operations are in two steps. First the two tabs at one end are welded, and thereafter the two tabs at the opposite end are welded. After this has been accomplished, the box is completed and is then discharged from the machine.

The above described machine enables large quantity production of boxes of plastic material to be effected in an exceedingly rapid and efficient manner, greatly decreasing the cost of production and making possible the economical manufacture of plastic boxes of uniform size, shape and with uniformly welded walls.

It is to be understood that numerous changes may be effected in details of construction, arrangement, operation and choice of materials without departing from the spirit of the invention, especially as defined in the appended claims.

What I claim is:

1. A machine for making boxes composed of plastic sheet material comprising means intermittently operable to engage the leading edge of a continuous sheet of plastic material and advance same a predetermined distance, severing means operable recurrently in timed relation to said sheet advancing means to sever a section of predetermined length from the sheet each time the latter is advanced, blanking means operable in timed relation to said sheet advancing means to form a box blank from each severed section of the sheet, a turntable, a jig on said turntable to receive a box blank, said jig comprising a pair of laterally spaced plates for use in box end wall folding, a pair of laterally spaced blocks on each of said plates, shouldered portions on the facing sides of each pair of blocks for use in folding tabs on opposite sides of each box end wall and a pair of laterally spaced side wall folding plates disposed at right angles to said first plates and having facing side edge portions disposed below the plane of the side edge portions of said first plates, means operable in timed relation to said sheet advancing and blanking means to rotate the turntable step-by-step and advance the same and said jig to successive stations, transfer means operable in timed relation during a dwell in the rotation of the turntable to deliver a box blank from the blanking means to the jig, said transfer means comprising a rotatable suction head, means for imposing a constant suction on the head to lift a blank from the blanking means and during movement of the head to the discharge position over the jig and means for rendering the suction ineffective when the head has been rotated to the discharge position, curved heated blade means at one station of the turntable cooperable with the jig to fold tab portions of a blank at right angles to respective end-wall portions, heated plate means at a succeeding station of the turntable cooperable with the jig to successively fold end-wall portions and then side-wall portions of the blank so that the tab portions are in lapping relation to the adjacent side-wall portions, and means at another succeeding station of the turntable cooperable with the jig to secure said tab portions to said side-wall portions.

2. A machine as claimed in claim 1, wherein the means for folding the respective portions of the blank of plastic sheet material comprises plunger means having a heater element engageable with the juncture of the end walls and tabs of the box blank to render the latter foldable, said plunger means movable sufficiently to force the tabs of the box blank over the shouldered portions of the jig for folding the tabs at right angles to the end walls and other plunger means having heater elements for pushing the box blank progressively into the jig and forcing the end walls first over the end wall folding plates of the jig to fold the same upwardly and then the side walls over the side wall folding plates of the jig to fold the same against the end wall tabs.

3. A machine as claimed in claim 1, wherein the securing means for the tab and side-wall portions comprises welding mechanism operable to unite homogeneously the said tab and side-wall portions.

4. A machine as claimed in claim 2, wherein there are provided pneumatic means for actuating each plunger means, and hydraulic check means associated with each pneumatic means for enabling each plunger to move quickly to the work and then slowly during the working period, and retract abruptly upon completion of the work.

5. A machine as claimed in claim 3, wherein the welding mechanism operates sequentially first to weld the tabs at one end of the box and then the tabs at the opposite end.

6. A machine for making boxes composed entirely of plastic sheet material comprising means intermittently operable to engage the leading edge of a continuous sheet of plastic material and advance same a predetermined distance, severing means operable recurrently in timed relation to said sheet advancing means to sever a section of predetermined length from the sheet each time the latter is advanced, blanking means operable in timed relation to said sheet advancing means to form a box blank from each severed section, a turntable, means operable in timed relation to said sheet advancing and blanking means to rotate the turntable step-by-step to successive stations, a plurality of jigs on said turntable positioned correspondingly to the stations thereof, each of said jigs comprising a pair of laterally spaced box end wall folding plates, a pair of laterally spaced blocks on each of said plates, tab folding shouldered portions on the facing side of each pair of blocks, and a pair of laterally spaced side wall folding plates disposed at right angles to said first plates and having facing edges disposed below the plane of the side edge portions of said first plates, transfer means operable in timed relation during a dwell in the rotation of the turntable to deliver a box blank from the blanking means to the jigs successively, said transfer means comprising a pair of suction heads on a common mounting movable up and down and rotatable for positioning one head in blank pick-up position and the other in blank discharge position, means to impose a constant suction on said mounting and means for connecting each head to said mounting so that suction is imparted to the head in blank pick-up position and the suction is rendered inoperative in blank discharge position to discharge a blank, heated blade means at one station of the turntable cooperable with a jig to fold tab portions of a blank at right angles to respective end-wall portions, heated blade means at a succeeding station of the turntable cooperable with a jig to successively fold end-wall portions and then side-wall portions of the blank so that the tab portions are in lapping relation to the adjacent side-wall portions, and means at another succeeding station of the turntable cooperable with a jig to secure said tab portions to said side-wall portions.

7. A machine as claimed in claim 6, wherein the means for rendering the severing means operative includes pneumatic devices and means operable in response to step-by-step rotation of the turntable for controlling operation of said pneumatic devices.

8. A machine as claimed in claim 6, wherein means is provided which is operable automatically to positively retain the turntable accurately in each station position between successive step-by-step movements thereof.

9. A machine as claimed in claim 6, wherein means is provided intermediate the box wall folding station and welding station for embossing the folded box, said embossing means comprising vertically movable plunger means, a heated embossing die, a piston carrying said embossing die reciprocable within said plunger, said plunger being movable by gravity to operative position, latch means for positively holding said plunger in operative position; fluid pressure means for successively releasing said latch means and moving said plunger means and piston to inoperative position, fluid pressure means for actuating said piston outwardly of the plunger, spring means for retracting said plunger, a die cooperating with said first die, a vertically movable piston means for said second die, fluid pressure means for actuating said last piston means, means associated with said last fluid pressure means and responsive thereto to provide a solid backing for blocking retraction of said last piston during the embossing operation, and means for actuating said backing means to inoperative position when said last fluid pressure means is shut off thereby to allow said second die and associated parts to return by gravity to inoperative position.

References Cited in the file of this patent

UNITED STATES PATENTS

| | | |
|---|---|---|
| 170,039 | Williams | Nov. 16, 1875 |
| 285,058 | Nickerson | Sept. 18, 1883 |
| 558,500 | Leavitt | Apr. 21, 1896 |
| 866,601 | Rockie et al. | Sept. 17, 1907 |
| 1,104,012 | Staude | July 21, 1914 |
| 1,492,510 | Escobales | Apr. 29, 1924 |
| 1,626,190 | Elliot | Apr. 26, 1927 |
| 1,802,968 | Everett et al. | Apr. 28, 1931 |
| 1,885,910 | Gwinn et al. | Nov. 1, 1932 |
| 1,913,055 | Keller | June 6, 1933 |
| 2,013,949 | Clark | Sept. 10, 1935 |
| 2,077,913 | Waters | Apr. 20, 1937 |
| 2,122,254 | Kranich et al. | June 28, 1938 |
| 2,247,787 | Schmidt | July 1, 1941 |
| 2,251,477 | Wisman | Aug. 5, 1941 |
| 2,306,732 | Huxham | Dec. 29, 1942 |
| 2,354,714 | Strickland | Aug. 1, 1944 |
| 2,370,757 | Spurr | Mar. 6, 1945 |
| 2,434,573 | Mann et al. | Jan. 13, 1948 |
| 2,473,404 | Young | June 14, 1949 |
| 2,484,656 | Sikka et al. | Oct. 11, 1949 |
| 2,535,961 | Schutt | Dec. 26, 1950 |
| 2,551,966 | Pierce | May 8, 1951 |
| 2,559,365 | Middleton et al. | July 3, 1951 |
| 2,612,822 | Bickford | Oct. 7, 1952 |
| 2,618,207 | Hery et al. | Nov. 18, 1952 |

UNITED STATES PATENT OFFICE
CERTIFICATE OF CORRECTION

Patent No. 2,843,027 July 15, 1958

Luther Earl Sevison

It is hereby certified that error appears in the printed specification of the above numbered patent requiring correction and that the said Letters Patent should read as corrected below.

Column 1, line 53, for "continguous" read -- contiguous --; column 14, line 18, for "embarcing" read -- embracing --; line 31, for "operativley" read -- operatively --; column 16, line 17, for "elongtae" read -- elongate --; column 23, line 31, for "to" read -- in --; line 50, for "form" read -- from --.

Signed and sealed this 21st day of October 1958.

(SEAL)
Attest:
KARL H. AXLINE
Attesting Officer

ROBERT C. WATSON
Commissioner of Patents